US009451442B2

(12) United States Patent
Zhang et al.

(10) Patent No.: US 9,451,442 B2
(45) Date of Patent: Sep. 20, 2016

(54) SERVICE PROCESSING METHOD AND APPARATUS IN COMMUNICATION NETWORK

(71) Applicant: HUAWEI TECHNOLOGIES CO., LTD., Shenzhen, Guangdong (CN)

(72) Inventors: Yanping Zhang, Shanghai (CN); Xiaobo Wu, Shanghai (CN); Shufeng Shi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/511,435

(22) Filed: Oct. 10, 2014

(65) Prior Publication Data

US 2015/0024748 A1 Jan. 22, 2015

Related U.S. Application Data

(63) Continuation of application No. PCT/CN2012/073743, filed on Apr. 10, 2012.

(51) Int. Cl.
*H04W 4/00* (2009.01)
*H04W 8/04* (2009.01)
*H04W 4/14* (2009.01)
*H04W 8/12* (2009.01)

(52) U.S. Cl.
CPC ............... *H04W 8/04* (2013.01); *H04W 4/14* (2013.01); *H04W 8/12* (2013.01)

(58) Field of Classification Search
CPC ....................................................... H04W 4/14
See application file for complete search history.

(56) References Cited

U.S. PATENT DOCUMENTS

| 2008/0259873 | A1 | 10/2008 | Ahmavaara et al. |
| 2010/0061331 | A1* | 3/2010 | Guo .................... H04W 76/068 370/329 |
| 2010/0120427 | A1 | 5/2010 | Guo |
| 2011/0110308 | A1 | 5/2011 | Liang et al. |
| 2011/0116449 | A1 | 5/2011 | Hu et al. |

(Continued)

FOREIGN PATENT DOCUMENTS

| CN | 101415175 | 4/2009 |
| CN | 101577955 | 11/2009 |

(Continued)

OTHER PUBLICATIONS

International Search Report mailed Jan. 24, 2013, in corresponding International Patent Application No. PCT/CN2012/073743.

(Continued)

*Primary Examiner* — Sam K Ahn
*Assistant Examiner* — Fabricio R Murillo Garcia
(74) *Attorney, Agent, or Firm* — Staas & Halsey LLP

(57) ABSTRACT

The present invention relates to a service processing method and apparatus in a communication network. In the technical solutions provided in the embodiments of the present invention, the second mobility management network element can determine, according to the received indication information, whether to send a message to the HSS or HLR or whether to activate the ISR, so that in a communication system, it is ensured that a user equipment can carry out a corresponding service, and signaling transmission in the communication network can be further reduced, thereby improving network performance.

11 Claims, 9 Drawing Sheets

(56) References Cited

U.S. PATENT DOCUMENTS

| | | | |
|---|---|---|---|
| 2012/0002625 A1 | 1/2012 | Wu | |
| 2012/0315930 A1 | 12/2012 | Ai | |
| 2013/0267263 A1* | 10/2013 | Tseng | H04W 4/14 455/466 |
| 2014/0235284 A1 | 8/2014 | Chen et al. | |
| 2014/0247762 A1 | 9/2014 | Ai | |
| 2014/0287752 A1* | 9/2014 | Stojanovski | H04W 4/14 455/435.1 |
| 2015/0296354 A1* | 10/2015 | Liao | H04W 4/14 455/466 |

FOREIGN PATENT DOCUMENTS

| | | | |
|---|---|---|---|
| CN | 101657024 | 2/2010 | |
| CN | 101998335 | 3/2011 | |
| CN | 102083047 | 6/2011 | |
| CN | 102083048 A | 6/2011 | |
| CN | 102362513 A | 2/2012 | |
| FR | EP 2592884 A1 * | 5/2013 | H04W 8/02 |
| GB | 2429373 A | 2/2007 | |
| JP | 2010-525681 | 7/2010 | |
| JP | 2011-504029 | 1/2011 | |

OTHER PUBLICATIONS

PCT International Search Report dated Jan. 24, 2013 in corresponding International Patent Application No. PCT/CN2012/073743.

"3$^{rd}$ Generation Partnership Project; Technical Specification Group Services and System Aspects; Circuit Switched (CS) fallback in Evolved Packet System (EPS); Stage 2 (Release 11)", 3GPP TS 23.272 V11.0.0, Mar. 2012, pp. 1-87.

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.1.0, Mar. 2012, pp. 1-284.

Extended European Search Report dated Mar. 6, 2015 in corresponding European Patent Application No. 12873931.5.

"Change Request—23.401 CR 2007", 3GPP TSG SA WG2 Meeting #83, Salt Lake City, Utah, USA, Feb. 2011, 26 pp.

"Change Request—23.401 CR 2316", SA WG2 Meeting #89, Vancouver, Canada, Feb. 2012, 30 pp.

Japanese Office Action dated Oct. 20, 2015 in corresponding Japanese Patent Application No. 2015-504832.

"PS only impact on the ISR&SMS over SGs", Huawei, Hisilicon, 3GPP TSG SA WG2 Meeting #90, TD S2-121427, Apr. 16-20, 2012, Bratislava, Slovakia, pp. 1-2.

Chinese Search Report dated Jun. 27, 2016 in corresponding Chinese Patent Application No. 2012800006115.

Chinese Office Action dated Jul. 5, 2016 in corresponding Chinese Patent Application No. 201280000611.5.

"Discussion for issues with deactivation of ISR", SA WG2 Meeting #89, Feb. 6-10, 2011, Vancouver, Canada, pp. 1-3.

* cited by examiner

| CONT. | CONT. | CONT. | CONT. | CONT. |
| FROM | FROM | FROM | FROM | FROM |
| FIG. 5A | FIG. 5A | FIG. 5A | FIG. 5A | FIG. 5A |

    

55: The user equipment moves to an LTE side, initiates a TAU request, carries, in the request, an identifier indicating whether the user equipment registers with the MSC/VLR or whether the network side provides, in the PS domain, the short message service for the user equipment, and sends the request to the second mobility management network element 56: The second mobility management network element decides, according to the identifier, whether to initiate location update 57: If the user equipment registeres with the MSC/VLR or the network side does not provide, in the PS domain, the short message service for the user equipment, initiate the location update 58. Cancel MSC/VLR registration

FIG. 5B

SERVICE PROCESSING METHOD AND APPARATUS IN COMMUNICATION NETWORK

CROSS-REFERENCE TO RELATED APPLICATIONS

This application is a continuation of International Application No. PCT/CN2012/073743,filed on Apr. 10, 2012, which is hereby incorporated by reference in their entireties.

TECHNICAL FIELD

The present invention relates to the field of communication technologies, and in particular, to a service processing method and apparatus in a communication network.

BACKGROUND

Prior Art 1

In an area where different 3GPP access technology networks are overlapped or are adjacent to each other, when changing an access system each time, for example, from a GERAN (GSM EDGE Radio Access Network, GSM/EDGE radio access network) or UTRAN (UMTS Terrestrial Radio Access Network, terrestrial radio access network) to an EUTRAN (Evolved Universal Terrestrial Radio Access Network, evolved universal terrestrial radio access network), or from an EUTRAN to a GERAN or UTRAN, a mobile user needs to initiate a location update procedure, thereby bringing a certain load for a core network and an air interface. In order to avoid the signaling load and optimize a mobility management mechanism between different 3GPP access systems, the 3GPP proposes an ISR (Idle mode signaling reduction, signaling reduction or signaling limitation) mechanism, so as to reduce mobility management procedures of a UE between different access networks.

A main idea of a corresponding ISR mechanism is that: After a mobile terminal registers with an SGSN (Serving GPRS Support Node, serving GPRS support node) and an MME (Mobility Management Entity, mobility management entity) in sequence, the ISR mechanism may be enabled (that is, the ISR is activated), and in this way, as long as the terminal does not leave a route area RA and tracking area TA where the terminal is located when registering with the SGSN and MME, it is not required to initiate any location update procedure, so that even the mobile user changes continuously in a 2G/3G cell and an LTE cell, no signaling load is brought. Moreover, even the RA or TA where the user is located is changed, as long as the SGSN and MME are not changed, for tracking area or route area update initiated by a UE (user equipment), an SGSN or MME is not required to register in an HSS (Home Subscriber Server, home subscriber server) or HLR (Home Location Register, home location register). At the same time, in order to ensure that a called service of the user is not affected, an SGW (Serving GW, serving gateway) needs to mark the mobile user enabling the ISR, and when receiving downlink data or signaling of the user, the SGW initiates a paging to the SGSN and the MME at the same time, thereby ensuring that the user can be paged.

In a process of implementing the present invention, the inventor finds that the prior art 1 has at least the following problems:

If the MME supports an "SMS in MME" function, namely, can perform transmission of an SMS (Short Messaging Service, short message service) service, the MME needs to allocate a non broadcast LAI (non broadcast location area identifier) to the user equipment. Based on this, if the MME activates an ISR function, when the user returns to a 2G/3G network, an LAI (location area identifier, location area identifier) in the 2G/3G network is different from the non broadcast LAI allocated by the MME, so that the user always needs to initiate a combined RAU (combined route area update) procedure, or an independent LAU (location area update, location area update) procedure. Therefore, although the ISR function is activated, signaling initiated by the user equipment cannot be reduced, and on the contrary, because the MME activates the ISR, when there is downlink data or signaling, the SGW always sends a message to the SGSN and the MME at the same time, or requests the SGSN/MME to page the user at the same time, which significantly increases a signaling load between the SGW and the SGSN/MME; at the same time, because the user equipment resides in coverage of the MME in this case, the SGSN cannot page the user at all, and a paging resource is totally wasted in this case, which affects resource use of other users.

Prior Art 2

In a communication system having a dual registration function, if a user equipment moves between a 2G or 3G network and an LTE (Long Term Evolution, long term evolution) system, in an RAU (route area update, Route Area Update) or TAU (tracking area update, tracking area update) procedure initiated by the user equipment when the user equipment moves to a new side, an HSS or HLR does not send location cancellation to an old side, so as to form dual registration in the HLR or HSS; when inter-RAT (inter-radio access technology) RAU or TAU occurs subsequently, an MME (Mobility Management Entity, mobility management entity) or SGSN (Serving GPRS Support Node, serving GPRS support node) at the new side does not send location update to the HSS or HLR.

In a process of implementing the present invention, the inventor finds that the prior art 2 has at least the following problems:

If the user equipment returns from the 2G or 3G network to an LTE (Long Time Evolution, long term evolution) network, because no location update message is sent to the HSS, and when the user equipment is at the 2G or 3G network side, the HSS sets an MSC to a short message destination network element, when a user equipment-related terminating short message arrives, the HSS returns an MSC address; however, the user equipment actually registers with the MME, so the MSC cannot send the short message to the user equipment, and therefore, a short message service of the user equipment cannot be performed normally, and user experience is poor.

If the user equipment registers with the MME when returning from the 2G or 3G network to the LTE network, the MME always sends a location update message to the HSS, so as to trigger the HSS to set the MME to a short message destination network element, which can ensure that a short message can be sent to the user equipment through the MME; however, in the communication system, not all user equipments perform corresponding dual registration, for a user equipment that does not perform the dual registration, when the user equipment returns to the MME side and it is required to send an SMS service to the user equipment, it is not required to initiate a location update operation, and in this case, if the location update operation is initiated accordingly, signaling transmission in the communication system is increased, thereby affecting performance of the communication system.

SUMMARY

An objective of the present invention is to provide a service processing method and apparatus in a communication system, so as to ensure normal performing of a service, and at the same time, reduce unnecessary signaling interaction in a communication system, and improve performance of the communication system.

The present invention is implemented through the following technical solutions.

A service processing method in a communication network includes:

receiving, by a second mobility management network element, indication information, and determining, according to the indication information, to execute at least one of sending a message to a home subscriber server HSS or a home location register HLR and not activating idle mode signaling reduction ISR, or, to execute at least one of not sending a message to an HSS or HLR and determining that ISR may be activated.

A signaling reduction apparatus in a communication network includes:

an indication information receiving unit, configured to receive indication information; and an operation execution processing unit, configured to determine, according to the indication information received by the indication information receiving unit, to execute at least one of sending a message to an HSS or HLR and not activating ISR, or, to execute at least one of not sending a message to an HSS or HLR and determining that ISR may be activated.

A signaling reduction method in a communication network includes:

receiving, by a second mobility management network element, a notification sent by an HSS or HLR about canceling the second mobility management network element serving as an SMS serving node; and determining to not activate ISR and/or send a message to the HSS or HLR.

A signaling reduction apparatus in a communication network includes:

a registration cancellation notification receiving unit, configured to receive a notification sent by an HSS or HLR about canceling SMS registration; and an operation execution unit, configured to, if the registration cancellation notification receiving unit receives the notification, determine to send a message to the HSS or HLR and/or not activate ISR.

A signaling reduction method in a communication network includes:

sending, by a user equipment, indication information to a second mobility management network element, where the indication information is used to instruct the second mobility management network element to execute at least one of sending a message to an HSS or HLR and not activating ISR, or, to execute at least one of not sending a message to an HSS or HLR and determining that ISR may be activated.

A user equipment includes:

an indication information sending unit, configured to send indication information to a second mobility management network element, where the indication information is used to instruct the second mobility management network element to execute at least one of sending a message to an HSS or MR and not activating ISR, or, to execute at least one of not sending a message to an HSS or HLR and determining that ISR may be activated.

It can be seen from the foregoing technical solutions that, different subsequent processing procedures are adopted according to the indication information, so that the second mobility management network element can determine, according to the received indication information, whether to execute at least one of sending a message to an HSS or MR and not activating ISR, or execute at least one of not sending a message to an HSS or HLR and determining that ISR may be activated; therefore, in the communication system, it may be ensured that the user equipment can carry out a corresponding service, signaling transmission in the communication network can also be reduced, and network performance is improved.

BRIEF DESCRIPTION OF DRAWINGS

To illustrate the technical solutions according to the embodiments of the present invention more clearly, accompanying drawings required for describing the embodiments are introduced briefly in the following. Apparently, the accompanying drawings in the following description are only some embodiments of the present invention, and persons of ordinary skill in the art can derive other drawings according to the accompanying drawings without creative efforts.

FIG. 5A and FIG. 5B are a flow chart of an application embodiment 2 of a method according to an embodiment of the present invention;

DESCRIPTION OF EMBODIMENTS

The technical solutions in the embodiments of the present invention are clearly described in the following with reference to the accompanying drawings in the embodiments of the present invention. Obviously, the embodiments to be described are only a part rather than all of the embodiments of the present invention. All other embodiments obtained by persons of ordinary skill in the art based on the embodiments of the present invention without creative efforts shall fall within the protection scope of the present invention.

In the technical solutions provided in the embodiments of the present invention, a second mobility management network element determines, according to indication information, that it is required to send a message to an HSS/HLR or that ISR may be activated, so as to ensure normal performing of a service, and effectively reduce an unnecessary operation to be executed, thereby reducing signaling transmission in a communication network and improving network performance.

Figure 1:
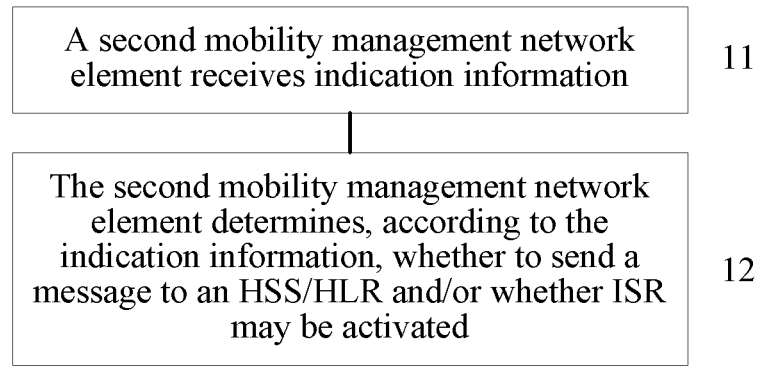
FIG. 1 is a schematic processing flow chart of a method according to an embodiment of the present invention.

A specific implementation of a signaling reduction method in a communication network provided in an embodiment of the present invention is shown in FIG. 1, which may include the following processing steps:

Step 11: A second mobility management network element receives indication information.

The indication information may specifically be used to indicate:

1) whether it is required to send a message to an HSS/HLR (that is, an HSS or an HLR); or 2) whether ISR may be activated, where, that ISR may be activated refers to that the second mobility management network element can activate ISR, and that ISR may not be activated refers to that the second mobility management network element cannot activate ISR; or 3) whether it is required to send a message to an HSS/HLR and whether ISR may be activated.

The sending a message to the HSS/HLR may be used for the second mobility management network element to be registered as an SMS serving node (for example, initiating a location update operation by sending a message to the HSS/HLR), so that a user equipment may carry out an SMS service through the second mobility management network element.

The indication information in the embodiment of the present invention and all subsequent embodiments may be identified by adopting a specific value of an information element in a message; by taking indicating whether to send a message to the HSS/HLR as an example, an information element "registration with HSS flag" may be carried in an interaction message, when the information element has a value of 1, it indicates that it is required to register with the HSS/HLR (that is, it is required to send a message to the HSS/HLR), and when the information element has a value of 0, it indicates that it is not required to register with the HSS/HLR; here, 0 or 1 is only taken as an example, and corresponding indication information may also be identified by adopting another value. Or, the corresponding indication information may also be identified by whether an information element exists in a message; for example, if the message has "registration with HSS flag", it indicates that it is required to send a message to the HSS/HLR, and if the message does not have "registration with HSS flag", it indicates that it is not required to send a message to the HSS/HLR, and vice-versa.

Particularly, for an indication of whether to activate ISR, the second mobility management network element may reuse an ISR support information element in an existing response message, and may also introduce a new information element, which is not limited in the present invention.

The corresponding indication information may be a direct indication, such as, a direct indication of whether it is required to send a message to the HSS/HLR or whether to activate ISR; and may also be an indirect indication, where the corresponding indirect indication includes, but is not limited to, indicating whether the user equipment registers with a third mobility management network element or whether a network side provides, in a PS domain, a short message service for the user equipment, and a format of the indication may be: PS only in use indication/flag (only supporting the PS domain) or SMS in SGSN flag, or the like, which is only an identifier naming problem and does not affect a function of the indication in the present invention. That the network side provides, in the PS domain, a short message service for the user equipment refers to that a PS domain core network device SGSN provides a short message service for a user. The user equipment may obtain the short message service without through an MSC/VLR of a CS domain device.

A corresponding manner for the user equipment or a first mobility management network element to determine that the network side provides, in the PS domain, the short message service for the user equipment is as follows: An access accept message of the first mobility management network element indicates a user equipment being SMS supported (short message supported) or that the network side provides, in the PS domain, the short message service for the user equipment; specifically, if the user equipment indicates that the first mobility management network element is "SMS only (only requiring the short message service)", and user subscription data is "PS only enabled (supporting a data domain short message service)", the first mobility management network element indicates, in the message, the user equipment being "SMS supported" or that the network side provides, in the PS domain, the short message service for the user equipment, and the user equipment may acquire, according to the indication, that the PS domain provides the short message service for the user equipment. Likewise, in the foregoing step, it is identified that the network side may provide the short message service for the user equipment through the PS domain, and in this case, it may be determined that the user equipment does not register with the third mobility management network element (the third mobility management network element may be a circuit domain network element, such as an MSC) or the user equipment cannot register with the third mobility management network element successfully. An access request message may be: a combined attach (combined attach) or an attach (attach) request message; or a combined RAU (combined RAU) request message or an RAU (route area update) request message in a GERAN/UTRAN network; or a combined TAU (combined TAU) request message or TAU (tracking area update) request message in an LTE network. The access accept message may be: a combined attach (combined attach) or an attach (attach) accept message; or a combined RAU (combined RAU) accept message or an RAU (route area update) accept message in a GERAN/UTRAN network; or a combined TAU (combined TAU) accept message or TAU (tracking area update) accept message in an LTE network.

Further, the corresponding indication information may include, but not limited to, a message used for implementing another function and received by the second mobility management network element, for example, an SMS registration cancellation message may be used directly as the corresponding indication information; or a message constructed or modified for implementing the present invention, for example, a context response message to which corresponding field information is added may be used as the indication information, and the like.

The indication information may be determined by adopting any of the following manners:

Manner 1: The first mobility management network element interacts with the user equipment, for example, receives an update message initiated by the user equipment, so the first mobility management network element may determine, based on a message interacted with the user equipment, that the user equipment does not register with the third mobility management network element or the network side provides, in the PS domain, the short message service for the user equipment, so as to indicate that the second mobility management network element does not send a message to the HSS/HLR or determine that ISR may be activated or the user equipment does not register with the third mobility management network element or the network side provides, in the PS domain, the short message service for the user equipment; if it is determined that the user equipment registers with the third mobility management network element or the network side does not provide, in the PS domain, the short message service for the user equipment, it indicates that the second mobility management network element sends a message to the HSS/HLR or that ISR is not activated, or it is indicated, based on a determination result, to the second mobility management network element that the user equipment registers with the third mobility management network element or the network side does not provide, in the PS domain, the short message service for the user equipment.

specifically, the first mobility management network element may, but not limited to, carry, in the context response message, an indication of information about whether the user equipment registers with the third mobility management network element, or an indication about that the network side provides, in the PS domain, the short message service for the user equipment, or an indication of whether to send a message to the HSS/HLR, or an indication of whether ISR may be activated, so as to send the message to the corresponding second mobility management network element.

Manner 2: The user equipment may determine, according to whether the user equipment has a registration procedure with the third mobility management network element and a result of successful registration, whether the user equipment registers with the third mobility management network element or whether the network side provides, in the PS domain, the short message service for the user equipment; if the user equipment does not register with the third mobility management network element or the network side provides, in the PS domain, the short message service for the user equipment, it indicates that the second mobility management network element does not send a message to the HSS/HLR or that ISR may be activated, or it is directly indicated to the second mobility management network element that the user equipment does not register with the third mobility management network element or the network side provides, in the PS domain, the short message service for the user equipment; if the user equipment registers with the third mobility management network element or the network side does not provide, in the PS domain, the short message service for the user equipment, it indicates that the second mobility management network element sends a message to the HSS/HLR or that ISR may not be activated, or it is directly indicated to the second mobility management network element that the user equipment registers with the third mobility management network or the network side does not provide, in the PS domain, the short message service for the user equipment, where the user equipment may, but not limited to, include, in the access request message sent by the user equipment to the second mobility management network element, information about registration with the third mobility management network element or information indicating that the network side provides, in the PS domain, the short message service for the user equipment, or the indication of whether to send a message to the HSS/HLR or an indication of whether ISR may be activated, and send the access request message to the second mobility management network element.

In Manner 1 and Manner 2, the indication of whether to send a message to the HSS/HLR and the indication of whether ISR may be activated may be a same indication (that is, a same indication may be used to indicate whether to send a message to the HSS/HLR and whether ISR may be activated), or, may respectively correspond to different indications (that is, the indication is only used to indicate whether to send a message to the HSS/HLR, or, is only used to indicate whether ISR may be activated).

Manner 3: After acquiring that the user equipment registers with the third mobility management network element, the HSS or MR cancels the registration of the second mobility management network element as a short message (SMS) serving node and notifies the second mobility management network element of canceling the registration of the second mobility management network element as the short message serving node, and the second mobility management network element may determine, according to the notification of the HSS or HLR, whether the user equipment registers with the third mobility management network element, that is, the second mobility management network element uses the notification as the indication information, and may determine, according to the notification, that the user equipment registers with the third mobility management network element, where the indication information in this case is used to indicate that the user equipment registers with the third mobility management network element.

Specifically, in Manner 3, when the user equipment registers with the third mobility management network element, an MSC/VLR notifies the HSS/HLR, and after receiving the notification, the HSS/HLR cancels the registration of the second mobility management network element as the short message serving node, and sends, to the second mobility management network element, a message of canceling the registration of the second mobility management network element as the short message serving node, and in this way, the second mobility management network element executes step 12 after receiving the message sent by the HSS/HLR.

Step 12: The second mobility management network element determines, according to the received indication information, to execute at least one of sending a message to the HSS or HLR and not activating ISR, or execute at least one of not sending a message to the HSS or HLR and determining that ISR may be activated; that is, determines whether to send a message to the HSS/HLR and/or determines whether ISR may be activated.

According to different received indication information, the corresponding determining whether to send a message to the HSS/HLR and/or whether to activate ISR may specifically include:

(1) Received indication information is used to directly indicate whether to send a message to the HSS/HLR or whether to activate ISR.

If the corresponding indication information is used to indicate sending a message to the HSS/HLR, when receiving a (combined) tracking area update request { (combined) TAU request} message of the user equipment or being in a (combined) tracking area update request procedure, the second mobility management network element sends a message to the HSS/HLR, and after receiving the message, the HSS/HLR sets an MME to a short message serving node; if the corresponding indication information is used to indicate not sending a message to the HSS/HLR, when receiving a (combined) tracking area update request message of the user equipment or being in a (combined) tracking area update request procedure, the second mobility management network element does not send a message to the HSS/HLR.

If the corresponding indication information is used to indicate that it is determined that ISR may be activated, in a subsequent processing procedure, the second mobility management network element activates the ISR, and if the corresponding indication information is used to indicate that ISR is not activated, in a subsequent processing procedure, the second mobility management network element does not activate the ISR, an SGW performs signaling interaction with the second mobility management network element, but does not perform signaling interaction with the first mobility management network element, thereby saving a resource at the first mobility management network element side.

(2) The received indication information is used to indicate that the user equipment registers with the third mobility management network element or the network side does not provide, in the PS domain, the short message service for the user equipment.

If the received indication information is used to indicate that the user equipment registers with the third management network element or the network side does not provide, in the PS domain, the short message service for the user equipment, when receiving a (combined) tracking area update request message of the user equipment or being in a (combined) tracking area update request procedure, the second mobility management network element sends a message to the HSS/HLR, and after receiving the message, the HSS/HLR sets an MME to a short message serving node; the second mobility management network element does not activate ISR, an SGW performs signaling interaction with the second mobility management network element, but does not perform signaling interaction with the first mobility management network element, thereby saving a resource at the first mobility management network element side; on the contrary, if the received indication information is used to indicate that user equipment does not register with the third management network element or the network side provides, in the PS domain, the short message service for the user equipment, when receiving a (combined) tracking area update request message of the user equipment or being in a (combined) tracking area update request procedure, the second mobility management network element does not send a message to the HSS/HLR, and the second mobility management network element may activate ISR.

(3) The received indication information is used to notify the second mobility management network element of canceling the registration of the second mobility management network element as the short message serving node.

If the HSS/HLR sends a message to the second mobility management network element to cancel the registration of the second mobility management network element as the short message serving node, the second mobility management network element cancels a short message service of the user equipment after receiving the message. However, context information of the user is not deleted (reserved). Optionally, the second mobility management network element may delete subscription information related to short messages of the user equipment; when the second mobility management network element receives a (combined) tracking area update request message of the user equipment or a (combined) tracking area update request includes an SMS only indication, if PS (packet switch, packet switch) subscription data allows the short message service, the second mobility management network element sends a message to the HSS/HLR, so as to be registered as a short message serving node. Optionally, it is indicated that the HSS/HLR does not require the subscription data, and after receiving the message, the HSS/HLR sets the second mobility management network element to a short message serving node; optionally, subscription data is not sent to the second mobility management network element; on the contrary, if the second mobility management network element does not receive an SMS registration cancellation message sent by the HSS/HLR, the second mobility management network element does not send a message to the HSS/HLR.

If the HSS/HLR sends a message to the second mobility management network element to cancel the registration of the second mobility management network element as a short message serving node, but PS subscription data still allows the short message service, the second mobility management network element determines that the user registers with the MSC/VLR after receiving the message, and the second mobility management network element does not activate the ISR, the SGW performs signaling interaction with the second mobility management network element but does not perform signaling interaction with the first mobility management network element, thereby saving the resource at the first mobility management network element side; if the second mobility management network element does not receive the message sent by the HSS/HLR about canceling the registration of the second mobility management network element as an SMS serving node, the second mobility management network element determines that the ISR may be activated.

It should be noted that, operations of sending a message to the HSS/HLR and activating the ISR by the second mobility management network element do not have any association relationship, it may be determined respectively whether to execute the two operations separately, it may specifically be selected to determine whether to execute one operation (for example, only determine whether to send a message to the HSS/HLR or only determine whether to activate the ISR), and it may also be determined whether to execute the two operations at the same time (for example, determine whether to send a message to the HSS/HLR and determine whether to activate the ISR at the same time).

It should be particularly noted that, steps 11 and 12 are not required to be two steps executed successively, and between executing the corresponding step 11 and step 12, the second mobility management network element may execute another signaling processing procedure. Therefore, after receiving the indication information, the second mobility management network element may further set a corresponding mark according to the indication information, where the mark is used to indicate at least one of sending a message to the HSS or HLR and not activating ISR, or indicate executing at least one of not sending a message to the HSS or HLR and activating ISR.

In the embodiment, the corresponding second mobility management network element may be an MME, and the corresponding first mobility management network element may be an SGSN, and the third mobility management network element may be an MSC/VLR. Definitely, the corresponding first mobility management network element, second mobility management network element, and third mobility management network element may also be other network entities, as long as network entities in the communication system execute the corresponding processing procedure to implement the present invention, which should all fall within the protection scope of the present invention.

Through the technical solution provided in the foregoing embodiment, different subsequent processing procedures are adopted according to the indication information, so as to ensure that the second mobility management network element can send a message to the HSS/HLR when necessary; therefore, normal performing of a subsequent service may be ensured, and signaling interaction between the second mobility management network element and the HSS/HLR may also be effectively reduced. At the same time, the second mobility management network element may also correctly activate the ISR according to the indication information, so as to reduce unnecessary signaling interaction between entities in the communication network, thereby saving a communication network resource and improving network performance.

For ease of understanding of the embodiment of the present invention, the implementation process of the embodiment of the present invention is illustrated in detail in combination of a specific application in the following.

Figure 2:
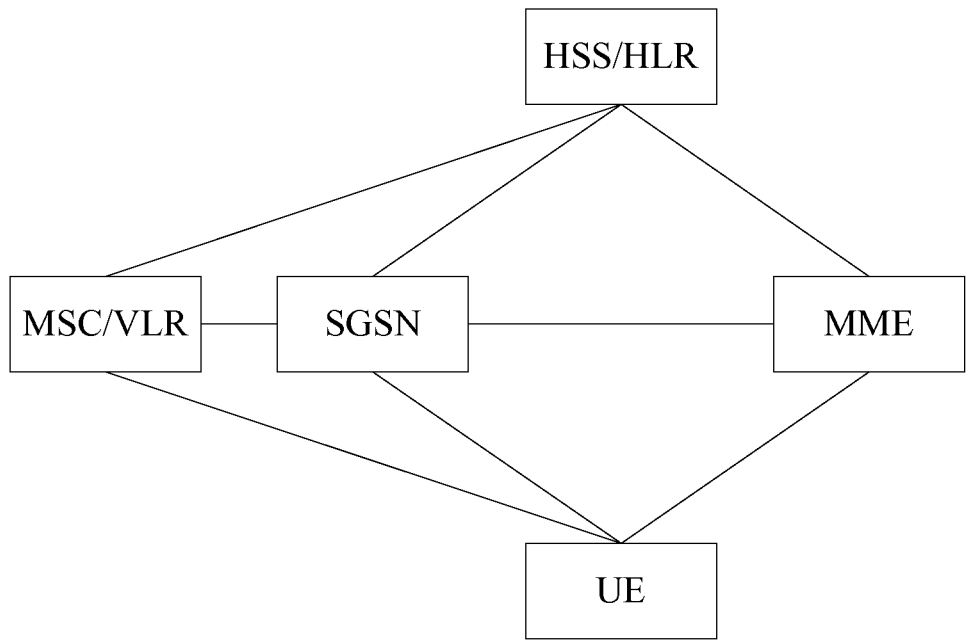
FIG. 2 is a schematic structural diagram of a system to which an embodiment of the present invention is applied.

The embodiment of the present invention may specifically be used in network architecture shown in FIG. 2, the network architecture includes entities in an EUTRAN and a GERAN or a UTRAN, and corresponding entities specifically include: an HSS (Home Subscriber Server, home subscriber server) or an HLR (Home Location Register, home location register), an MSC (mobile switching center, Mobile Switching Center) or a VLR (visitor location register, Visitor Location Register), a UE (User Equipment, user equipment), and an MME (Mobility Management Entity, mobility management entity) of an SGSN (Serving GPRS Support Node, serving GPRS support node) and LTE (Long Term Evolution, long term evolution) network, where the HSS or HLR is referred to as HSS/HLR for short, and the MSC or VLR is referred to as MSC/VLR for short.

In the network architecture, a service that needs to be transmitted includes a CS (circuit) domain service and a PS (data) domain service. For the user equipment, all subscription services are transmitted through a PS domain, and a situation that the user equipment does not have CS domain subscription data is referred to as a communication system having a PS-only (only supporting a data domain) property. In order to perform transmission of an SMS (Short Messaging Service, short message service) originally belonging to a CS domain in the communication system having the PS-only property, the SGSN is enabled to support the transmission of the SMS in the PS domain, and an SMS in MME (SMS based on the MME) structure is proposed in the LTE system, so as to perform the transmission of the SMS based on NAS (non-access layer) signaling, thereby satisfying an application scenario having no other CS service requirement except for the SMS. Further, to satisfy the PS-only property requirement, PS-only related content is added in user subscription data, and includes "PS-only enforced" and "PS-only enabled". The "PS-only enforced" is used to indicate that no CS subscription data exists, and the "PS-only enabled" is used to indicate to the SGSN or MME that the user equipment may use a PS domain SMS function.

When the user equipment is at the MME side, if the user equipment only requires the PS domain service and the SMS service, the user equipment sends an SMS-only identifier to the MME when initiating a combined Attach (attach) or TAU. If the MME supports the SMS in MME, based on an indication of the user equipment and the PS-only subscription data, the MME does not establish a connection with the MSC/VLR, and the MME allocates a non-broadcast LAI (Location Area Identity, location area identity) and a reserved TMSI (Temporary Mobile Station Identity, temporary mobile station identity), so as to perform transmission of the SMS service based on the MME.

Specifically, based on the foregoing PS-only scenario, the user equipment may not need to perform MSC/VLR registration at a first mobility management network element side. In this case, when the user equipment returns to a second mobility management network element, it is not required to execute a location update operation to cancel the MSC/VLR registration. Therefore, it is proposed in the embodiment of the present invention that the second mobility management network element determines, according to the received indication information, whether to execute at least one of sending a message to the HSS or HLR and not activating ISR, or executes at least one of not sending a message to the HSS or HLR and determining that ISR may be activated, for example, sending a message to the HSS/HLR to implement the location update operation, and the like. Therefore, based on whether the user equipment performs MSC/VLR registration, the second mobility management network element may decide whether to initiate location update, so as to reduce unnecessary interaction with the HSS/HLR.

In addition, if the MME supports the "SMS in MME" function, after the user equipment registers with the MME side, if the MME activates an ISR function, when a user returns to a 2G/3G network, an LAI of the 2G/3G network is different from the non broadcast LAI allocated by the MME, so that the user always has to initiate a combined RAU procedure or separate LAU procedure, and signaling initiated by the user equipment cannot be reduced; and when downlink data or signaling exists, an SGW always sends a message to the SGSN and the MME at the same time, or requests the SGSN/MME to page the user at the same time, which significantly increases a signaling load between the SGW and the SGSN/MME. Therefore, it is proposed in the embodiment of the present invention that the second mobility management network element determines, according to the received indication information, whether to execute at least one of sending a message to the HSS or HLR and not activating the ISR, or execute at least one of not sending a message to the HSS or HLR and determining that the ISR may be activated, thereby achieving an objective of signaling reduction.

Figure 3:
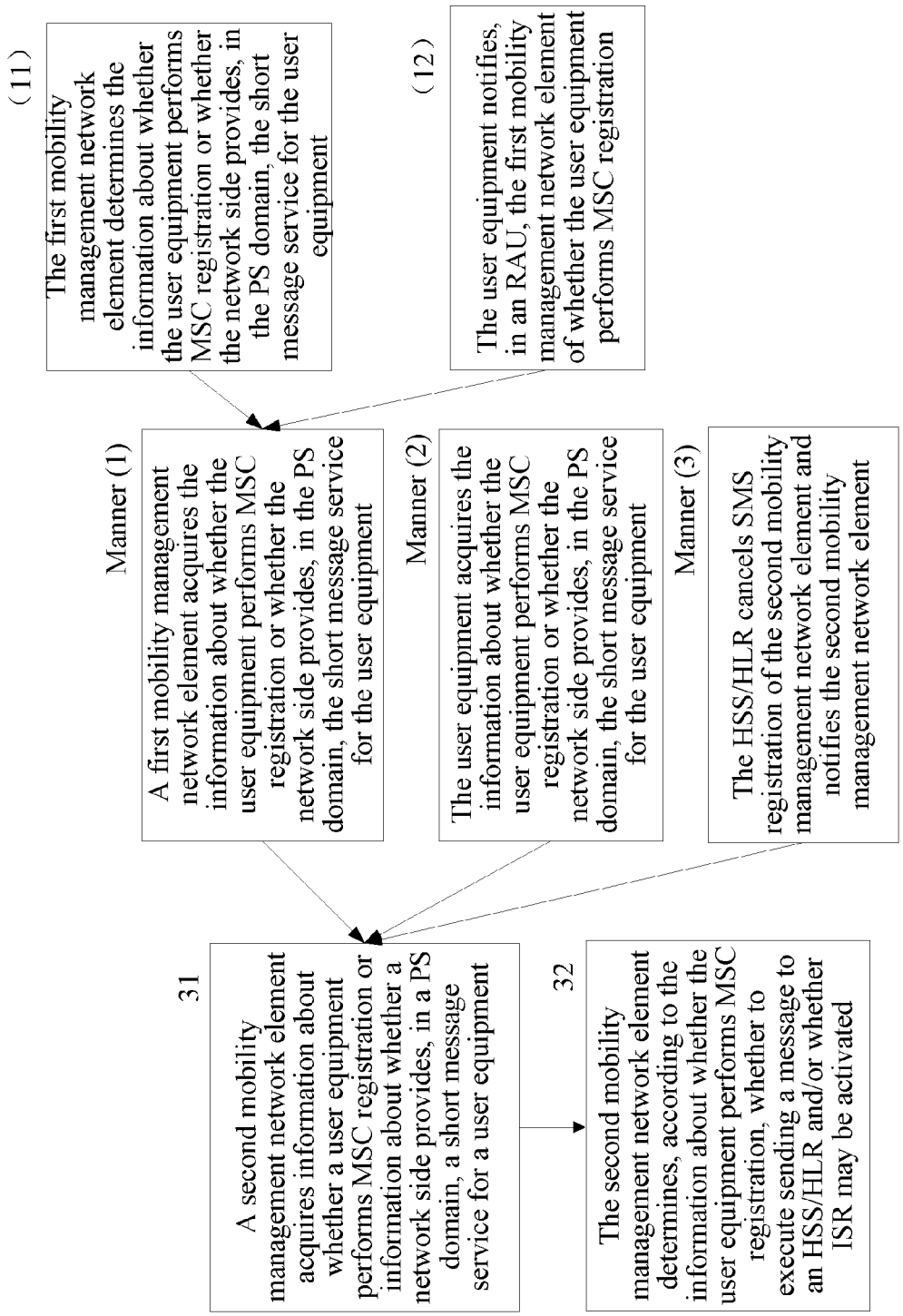
FIG. 3 is a schematic processing flow chart of applying a method according to an embodiment of the present invention to the system shown in FIG. 2.

Based on the network architecture provided in FIG. 2 and a communication function of the network architecture, as shown in FIG. 3, by taking that a second mobility management network element receives a corresponding indirect indication as an example, a specific implementation process of the embodiment of the present invention includes:

Step 31: A second mobility management network element (for example, an MME) acquires information about whether a user equipment performs MSC/VLR registration or information about whether a network side provides, in a PS domain, a short message service for a user equipment, that is, the second mobility management network element uses the information about whether a corresponding user equipment performs MSC/VLR registration as indication information.

A corresponding second mobility management network element may be an MME in FIG. 2, a corresponding first mobility management network element may be an SGSN in FIG. 2, and an MSC/VLR is equivalent to a third mobility management network element described in the foregoing.

A manner for the second mobility management network element to acquire the information about whether the user equipment performs the MSC/VLR registration may be, but not limited to, any one of the following manners:

Manner (1): The first mobility management network element acquires the information about whether the user equipment performs the MSC/VLR registration, and specifically, in this manner, the first mobility management network element determines whether the user equipment performs the MSC/VLR registration at the first mobility management network element side or whether the network side provides, in the PS domain, the short message service for the user equipment, where corresponding determining manners may include, but not limited to:

(11) If subscription data of a user is PS-only enforced (without circuit domain subscription data), the first mobility management network element may determine that the user equipment does not registers with the MSC/VLR or cannot register with the MSC/VLR successfully, because user CS subscription data does not exist;

the user equipment indicates SMS only (only short message needed) when sending an access request message, and if the subscription data is PS-only enabled (data domain short message service supported), the first mobility management network element indicates that the user equipment supports a short message (SMS supported) or that the network side provides, in the PS domain, the short message service for the user equipment; in this case, the first mobility management network element may determine that the user equipment does not register with the MSC/VLR, or the first mobility management network element or user equipment determines that the network side provides, in the PS domain, the short message service for the user equipment;

or,

(12) The user equipment indicates, in an RAU/attach request message, to the first mobility management network element that whether the user equipment executes an LAU process, and if the user equipment executes the LAU process, the first mobility management network element determines that the user equipment performs the MSC/VLR registration, otherwise, determines that the user equipment does not perform the MSC/VLR registration; or the user equipment may further directly indicate to the first mobility management network element that whether the user equipment is performing the MSC/VLR registration.

In Manner (1), the first mobility management network element further needs to notify the second mobility management network element of determined information about whether the user equipment performs the MSC/VLR registration on the first mobility management network element or about whether the network side provides, in the PS domain, the short message service for the user equipment; a specific notification process may include that: When the user equipment moves to the second mobility management network element and initiates the TAU process, the second mobility management network element initiates a context request to the first mobility management network element, and in this case, the first mobility management network element notifies, in a context response message, the second mobility management network element of the information about whether the user equipment performs the MSC/VLR registration or about whether the network side provides, in the PS domain, the short message service for the user equipment.

Manner (2): The user equipment acquires the information about whether the user equipment performs the MSC/VLR registration or about whether the network side provides, in the PS domain, the short message service for the user equipment, and in this manner, the user equipment needs to determine whether the user equipment itself performs the MSC/VLR registration or whether the network side provides, in the PS domain, the short message service for the user equipment, where corresponding determining manners may include, but not limited to:

(21) If the user equipment does not initiate separate LAU (separate LAU) or combined RAU (combined RAU), or initiates separate LAU (separate LAU) or combined RAU (combined RAU) but the registration with the MSC/VLR is unsuccessful, it is determined that the user equipment does not perform the MSC/VLR registration;

or,

(22) The user equipment initiates combined RAU and LAU, and indicates SMS-only, and if a received RAU Accept (RAU accept) message indicates SMS Supported (short message service supported), it is determined that the user equipment does not perform the MSC/VLR registration or the network side provides, in the PS domain, the short message service for the user equipment.

In Manner (2), the user equipment further needs to notify the second mobility management network element of the information about whether the user equipment performs the MSC/VLR registration, and a specific notification process may include that: When the user equipment moves to the second mobility management network element side and initiates the TAU procedure, the user equipment sends, in a TAU request message, the information about whether the user equipment performs the MSC/VLR registration at the first mobility management network element side to the second mobility management network element.

Manner (3): Through a received message sent by an HSS/HLR about canceling registration of the second mobility management network element as an SMS serving node, the second mobility management network element acquires information about the user equipment performs the MSC/VLR registration.

An implementation process of this manner may specifically include that: When the user equipment performs the MSC/VLR registration at the first mobility management network element side or the network side does not provide, in the PS domain, the short message service for the user equipment, the MSC/VLR sends a message to the HSS/HLR for registration (that is, the user equipment performs the MSC/VLR registration), the HSS/HLR determines that the second mobility management network element is registered as a short message serving node with the HSS/HLR, and sends, to the second mobility management network element, a message of canceling the second mobility management network element serving as the short message serving node, and the second mobility management network element may determine, according to the message, that the user equipment performs the MSC/VLR registration or the network side does not provide, in the PS domain, the short message service for the user equipment; optionally, the second mobility management network element may determine, in combination of PS subscription data subscription data allowing a short message service, that the user equipment performs the MSC/VLR registration, and on the contrary, if the second mobility management network element does not receive the message, it may be determined that the user equipment does not perform the MSC/VLR registration.

It should be noted that, the SMS registration cancellation message only cancels the registration of the MME serving as the SMS serving node with the HSS/HLR, but does not cancel another EPS (Evolved Packet System, evolved packet system) service of the MME. A specific implementation manner for sending, through the HSS/HLR, the message of canceling the registration of the second mobility management network element as the SMS serving node is that: The HSS/HLR sends a message to the MME, where in this patent, the message may be, but not limited to, a cancel location (cancel location) message, and the message indicates the MME through a cancellation type (cancellation type) information element being "SMS", so as to cancel the registration; after receiving the message, the MME determines that the cancellation type is the SMS, and does not cancel user context, but only cancels providing the short message service for the user equipment; otherwise, the MME cancels the user context. That is, the HSS/HLR notifies the MME of canceling the registration of the MME serving as an SMS destination point without affecting any non-SMS service of the user, and after receiving the SMS registration cancellation message, the MME still provides the non-SMS service for the user equipment.

Step 32: The second mobility management network element determines, according to the acquired information about whether the user equipment performs the MSC/VLR registration or whether the network side provides, in the PS domain, the short message service for the user equipment, or the received message sent by the HSS about canceling the second mobility management network element serving as the short message serving node, whether to execute at least one of sending a message to the HSS or HLR and not activating the ISR, or execute at least one of not sending a message to the HSS or HLR and determining that the ISR may be activated;

the second mobility management network element may specifically determine, according to the acquired information about whether the user equipment performs the MSC/VLR registration or whether the network side provides, in the PS domain, the short message service for the user equipment, or whether the message sent by the HSS about canceling the second mobility management network element serving as the short message serving node is received in step 31, whether to send a message to the HSS/HLR, and whether to be registered as the short message serving node. The initiating a location update operation by the second mobility management network element may specifically include: If the user equipment does not perform the MSC/VLR registration or the network side provides, in the PS domain, the short message service for the user equipment, or the message sent by the HSS about canceling the registration of the second mobility management network element as the short message serving node is not received in step 31, the second mobility management network element does not send a message to the HSS/HLR, that is, does not initiate the location update, thereby reducing signaling interaction in the communication network and avoiding occurrence of a dual registration failure problem; if the user equipment performs the MSC/VLR registration or the network side does not provide, in the PS domain, the short message service for the user equipment, the second mobility management network element may send a message to the HSS/HLR, so as to be registered as the short message serving node; or the message sent by the HSS about canceling the registration of the second mobility management network element as the short message serving node is received in step 31, optionally, the second mobility management network element may allow the user to use the short message service in combination with the PS subscription data, so that the second mobility management network element may send a message to the HSS/HLR, so as to be registered as the short message serving node. Therefore, reliable transmission of services such as an SMS in the communication network is ensured; specifically, a corresponding manner for determining to allow the user to use the short message service based on the PS subscription data may include: If the second mobility management network element receives a tracking area update request or combined tracking area update request of the user equipment, where the request includes an "SMS only" indication, the second mobility management network element may acquire, according to the PS subscription data of the user, that the user is allowed to use the short message service;

or, the second mobility management network element may further determine, according to the acquired information about whether the user equipment performs the MSC/VLR registration or whether the network side provides, in the PS domain, the short message service for the user equipment, or whether the message sent by the HSS about canceling the registration of the second mobility management network element as the short message serving node is received in step 31, whether to initiate an operation of activating the ISR, which may specifically include: If the user equipment performs the MSC/VLR registration or the network side does not provide, in the PS domain, the short message service for the user equipment, or the message sent by the HSS about canceling the registration of the second mobility management network element as the short message serving node is not received in step 31, the second mobility management network element initiates an operation of activating the ISR, and if the user equipment does not perform the MSC/VLR registration or the network side provides, in the PS domain, the short message service for the user equipment, the second mobility management network element does not initiate an operation of activating the ISR, or if the message sent by the HSS about canceling the registration of the second mobility management network element as the short message serving node is received in step 31, optionally, the second mobility management network element may combine PS subscription data allowing a short message, and the second mobility management network element does not initiate an operation of activating the ISR, thereby reducing signaling transmission in the communication system, and saving a network resource.

In this embodiment, correspondingly, steps 31 and 32 are not required to be two steps executed successively, specifically, corresponding marking may be performed after step 31 is executed, and when requiring execution, the subsequent step 32 may determine an operation that needs to be executed only according to the corresponding mark, for example:

the MME that may serve as the second mobility management network element may set a corresponding mark according to an execution result of step 31, and therefore, in a subsequent TAU or combined TAU procedure, the MME may determine, according to the mark, whether to send a message to the HSS/HLR; or, the MME may determine, according to the mark, whether to activate the ISR in the subsequent processing procedure; or, the MME may determine, according to the mark, whether to execute sending a message to the HSS/HLR and whether to activate the ISR when required.

In step 31, by taking that the MME receives the message about canceling the registration as an SMS serving node as an example, in this case, a corresponding mark may be set, and then, if the MME supports the SMS in MME function, and acquires, according to the mark, that the HSS/HLR cancels the registration of the MME serving as the SMS serving node, the MME needs to send a message to the HSS/HLR, so that the HSS/HLR records the MME as an SMS serving node, and cancels the MSC/VLR registration. Alternatively, the MME sets a corresponding mark when receiving the message about canceling the registration of the MME serving as the SMS serving node, and therefore, in a subsequent processing procedure (for example, the TAU or combined TAU procedure), if the MME supports the SMS in MME function, and acquires, according to the mark, that the HSS/HLR cancels the registration of the MME serving as the SMS serving node, the MME cannot activate the ISR; otherwise, the MME can activate the ISR.

In the foregoing description process, that the second mobility management network element receives a corresponding indirect indication is only taken as an example for illustration, and in the following, the specific implementation process of the embodiment of the present invention is illustrated by taking that the second mobility management network element receives a corresponding direct indication as an example, which includes:

(I) The second mobility management network element receives indication information, and the corresponding indication information is directly used to indicate whether to execute at least one operation of sending a message to the HSS/HLR and whether to activate the ISR, so the indication information may be referred to as direct indication information.

Correspondingly, the direct indication information may specifically be sent to the second mobility management network element by the first mobility management network element or the user equipment, and a specific sending process may include, but not limited to:

if the first mobility management network element or the user equipment determines that the user equipment does not perform the MSC/VLR registration or the network side provides, in the PS domain, the short message service for the user equipment, sending, to the second mobility management network element, indication information indicating not sending a message to the HSS/HLR; if the first mobility management network element or the user equipment determines that the user equipment performs the MSC/VLR registration or the network side does not provide, in the PS domain, the short message service for the user equipment, sending, to the second mobility management network element, indication information indicating sending a message to the HSS/HLR;

or, if the first mobility management network element or the user equipment determines that the user equipment does not perform the MSC/VLR registration or the network side provides, in the PS domain, the short message service for the user equipment, sending, to the second mobility management network element, indication information indicating that it is determined that the ISR may be activated; if the first mobility management network element or the user equipment determines that the user equipment performs the MSC/VLR registration or the network side does not provide, in the PS domain, the short message service for the user equipment, sending, to the second mobility management network element, indication information indicating not activating the ISR;

or, if the first mobility management network element or the user equipment determines that the user equipment does not perform the MSC/VLR registration or the network side provides, in the PS domain, the short message service for the user equipment, sending, to the second mobility management network element, indication information indicating not sending a message to the HSS/HLR and indicating that it is determined that the ISR may be activated; if the first mobility management network element or the user equipment determines that the user equipment performs the MSC/VLR registration or the network side does not provide, in the PS domain, the short message service for the user equipment, sending, to the second mobility management network element, indication information indicating sending a message to the HSS/HLR and not activating the ISR.

In the foregoing processing procedure, a corresponding manner for the first mobility management network element or the user equipment to determine whether the user equipment performs the MSC/VLR registration or whether the network side provides, in the PS domain, the short message service for the user equipment has been described in the foregoing embodiment, reference may be made to descriptions of Manner (1) and Manner (2), and details are not repeatedly described herein.

(II) The second mobility management network element directly determines, according to the received indication information, whether to execute at least one of sending a message to the HSS or HLR and not activating the ISR, or execute at least one of not sending a message to the HSS or HLR and determining that the ISR may be activated.

According to different received indication information, a corresponding operation of determining whether to execute at least one of sending a message to the HSS or MR and not activating the ISR, or execute at least one of not sending a message to the HSS or MR and determining that the ISR may be activated may specifically include, but not limited to:

if the second mobility management network element receives indication information indicating not sending a message to the HSS/HLR, not sending a message to the HSS/HLR, for example, not initiating a corresponding location update operation; if the second mobility management network element receives indication information indicating sending a message to the HSS/HLR, executing the operation of sending a message to the HSS/HLR, so as to initiate a location update operation, and the like;

or, if the second mobility management network element receives indication information indicating that it is determined that the ISR may be activated, executing the operation of activating the ISR; if the second mobility management network element receives indication information indicating not activating the ISR, not activating the ISR, performing, by the SGW, signaling interaction with the second mobility management network element, but not performing signaling interaction with the first mobility management network element, thereby saving a resource at the first mobility management network element side;

or, if the second mobility management network element receives indication information indicating not sending a message to the HSS/HLR and indicating that it is determined that the ISR may be activated, not sending a message to the HSS/HLR and executing the operation of activating the ISR;

if the second mobility management network element receives indication information indicating sending a message to the HSS/HLR and not activating the ISR, executing the operation of sending a message to the HSS/HLR and not activating the ISR, performing, by the SGW, signaling interaction with the second mobility management network element, but not performing signaling interaction with the first mobility management network element, thereby saving a resource at the first mobility management network element side.

Likewise, in this embodiment, corresponding step (I) and step (II) are not required to be two steps executed successively, specifically, corresponding marking may be performed after the corresponding indication information is received in step (I), and then, when the subsequent step (II) needs to be executed, it may be determined, according to the corresponding mark, whether it is required to execute the corresponding operation.

If the embodiment of the present invention is applied in the communication system to control a processing procedure of whether the MME sends a message to the HSS/HLR, when the user equipment does not register with the MSC/VLR in the GERAN/UTRAN network, because the HSS/HLR has information about the MME serving as an SMS destination point, in his case, the MME does not need to send a message to the HSS/HLR for indicating that the HSS/HLR sets the MME to the SMS destination point, thereby reducing signaling interaction between the MME and the HSS/HLR. When the user equipment registers with the MSC/VLR in the GERAN/UTRAN network (in this case, the HSS/HLR only sets the MSC/VLR to the SMS destination point), the UE/HSS/HLR/SGSN notifies, through a direct or an indirect indication, the MME that it is required to send a message to the HSS/HLR when the user equipment registers with the MME and the MME supports SMS in MME, so as to notify the HSS/HLR of setting the MME as the short message destination point, and therefore, it may be avoided that a short message sent to the user equipment is sent to the MSC/VLR and that the short message cannot be sent to the user equipment because the user equipment is attached to the MME, which affects performing of the short message service of the user.

If the embodiment of the present invention is applied in the communication system to control a processing procedure of whether the MME activates the ISR, when the user equipment does not register with the MSC/VLR in the GERAN/UTRAN network, according to the indication information, the MME may activate the ISR, and therefore, when the user returns to the GERAN/UTRAN network, because it is not required to register with the MSC/VLR, the separate LAU or combined route area update procedure is not initiated because the non-broadcast LAI allocated by the MME is different from the LAI (location area identifier, location area identifier) in broadcast, thereby reducing signaling of the user equipment. When the user equipment registers with the MSC/VLR in the GERAN/UTRAN network, because the user equipment always initiates the separate LAU or combined route area update procedure in the GERAN/UTRAN, according to the indication information, the MME does not activate the ISR, the SGW performs interaction with the second mobility management network element and does not perform interaction with the first mobility management network element. Therefore, at least signaling interaction between the SGW and the SGSN may be reduced, and at the same time, it is avoided that the SGSN pages the user, thereby saving a paging resource of the GERAN/UTRAN.

In order to further understand the foregoing embodiment, a specific application process of the embodiment of the present invention is described in the following in combination with a specific message transmission procedure.

Embodiment 1

Figure 4A:
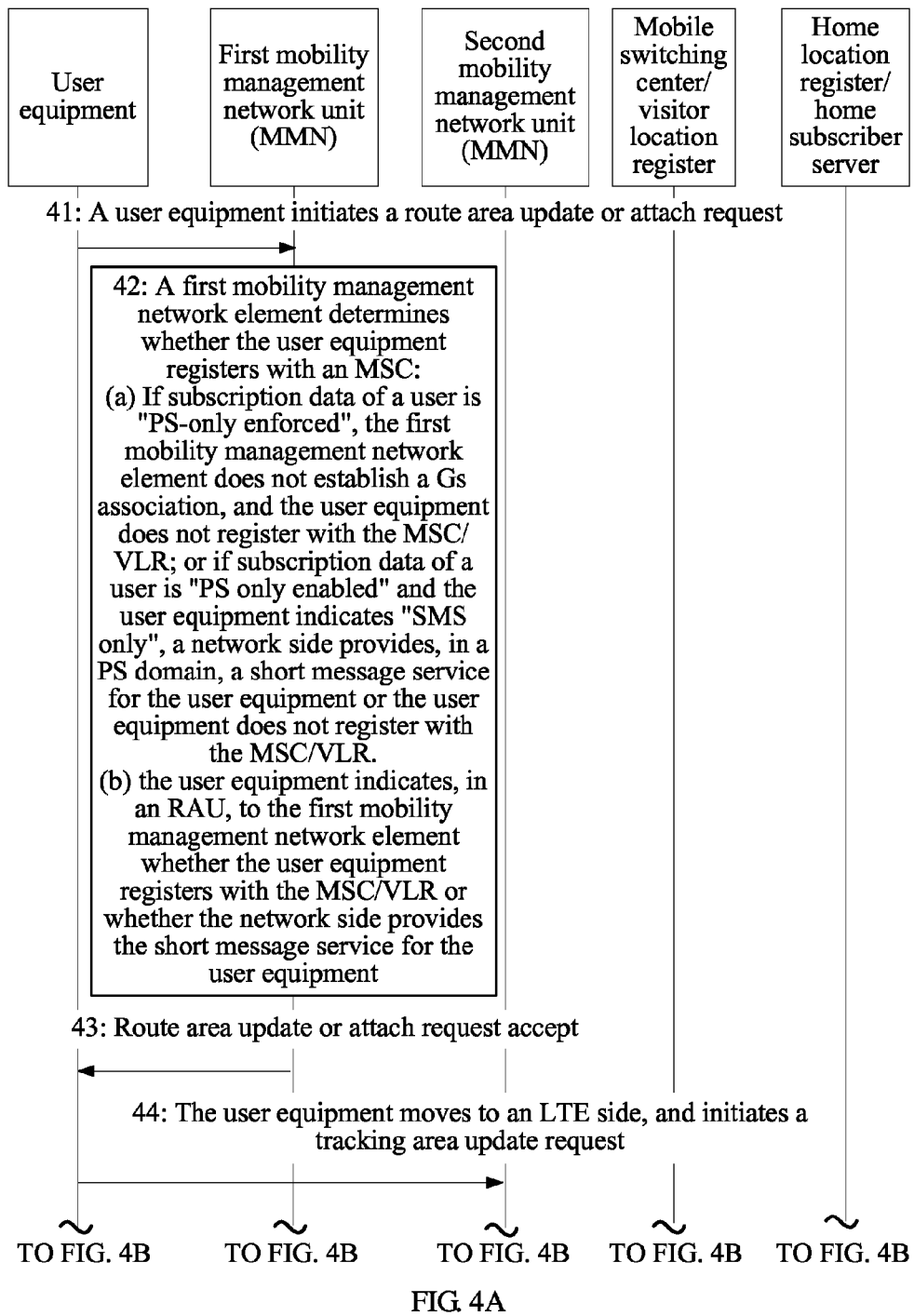
FIG. 4A and FIG. 4B are a flow chart of an application embodiment 1 of a method according to an embodiment of the present invention.
Figure 4B:
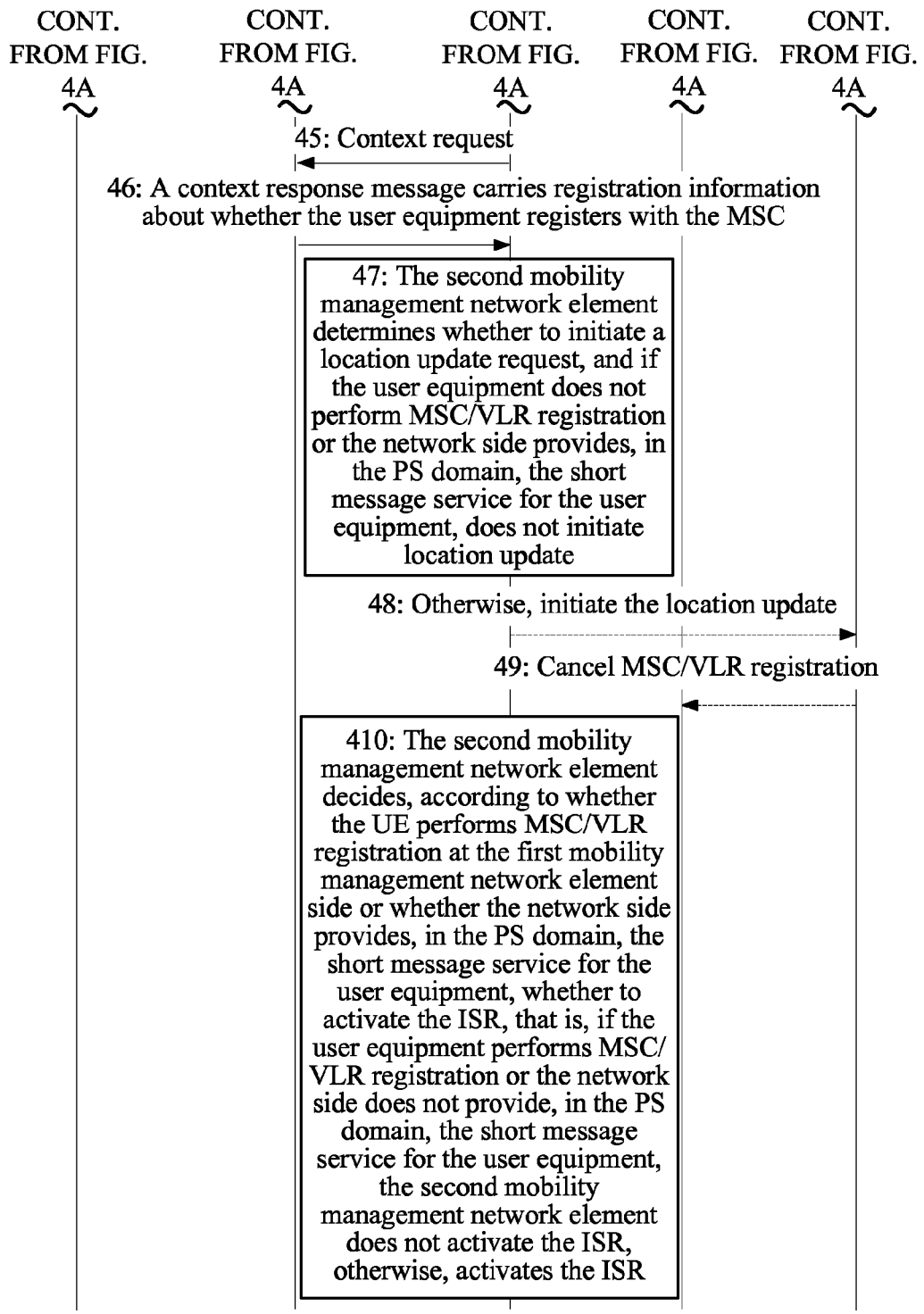

In this embodiment, specifically, that a second mobility management network element acquires, through a first mobility management network element, whether a user equipment performs MSC/VLR registration or whether a network side provides, in a PS domain, a short message service for a user equipment and determines, according to whether the user equipment performs MSC/VLR registration or whether the network side provides, in the PS domain, the short message service for the user equipment, whether to send a message to an HSS/HLR to initiate a location update operation is taken as an example, and as shown in FIG. 4A and FIG. 4B, a corresponding specific implementation process may include:

Step 41: A user equipment initiates an RAU/attach (route area update/attach) request or a combined RAU/LAU/attach (combined route area update and location area update/attach) request at a first mobility management network element (such as an SGSN) side.

Step 42: The first mobility management network element determines whether the user equipment performs MSC/VLR registration or whether the network side provides, in a PS domain, a short message service for the user equipment.

Specifically, a manner for determining whether the user equipment performs MSC/VLR registration or whether the network side provides, in the PS domain, the short message service for the user equipment may include, but not limited to, any of the following manners:

Manner 1: If subscription data of a user is PS-only enforced (without circuit domain subscription data), the first mobility management network element may determine that the user equipment does not register with an MSC/VLR or cannot register with an MSC/VLR successfully, because user CS subscription data does not exist, and therefore, it may be determined that the user equipment does not register with the MSC/VLR or the network side provides, in the PS domain, the short message service for the user equipment;

the user equipment indicates SMS only (only short message needed) when initiating a combined RAU/attach or an RAU/attach, if subscription data is PS-only enabled (data domain short message service supported), the first mobility management network element indicates that the user equipment supports a short message (SMS supported) or that the network side provides, in the PS domain, the short message service for the user equipment; based on this, the first mobility management network element may determine that the user equipment does not register with the MSC/VLR, or determine that the network side provides, in the PS domain, the short message service for the user equipment.

Manner 2: The user equipment indicates, in an RAU or attach request, to the first mobility management network element that the user equipment registers with the MSC/VLR or the network side does not provide, in the PS domain, the short message service for the user equipment.

Step 43: The first mobility management network element returns an RAU accept (RAU accept) or attach accept (attach accept) message to the user equipment.

Step 44: The user equipment moves to an LTE side, and initiates a TAU (tracking area update) request to a second mobility management network element.

Step 45: The second mobility management network element (such as an MME) sends a context request message to the first mobility management network element, to request for a user message.

Step 46: The first mobility management network element returns a context response message, where the context response message carries information about whether the user equipment performs MSC/VLR registration or whether the network side provides, in the PS domain, the short message service for the user equipment;

the information about whether the user equipment registers with the MSC/VLR or whether the network side provides, in the PS domain, the short message service for the user equipment is acquired through determination in step 42.

Step 47: The second mobility management network element determines, according to the acquired information about whether the user equipment performs MSC/VLR registration or whether the network side provides, in the PS domain, the short message service for the user equipment, whether to initiate location update, and if the user equipment does not perform MSC/VLR registration or the network side provides, in the PS domain, the short message service for the user equipment, does not initiate the location update; otherwise, execute step 48, to initiate a corresponding location update operation.

Step 48: If the second mobility management network element determines that the user equipment performs MSC/VLR registration at the first mobility management network element side or the network side does not provide, in the PS domain, the short message service for the user equipment, the second mobility management network element sends a location update request to an HSS/HLR, to initiate the location update operation.

Step 49: After receiving the corresponding location update request, the HSS/HLR cancels the MSC/VLR registration.

Step 410: The second mobility management network element decides, according to whether the user equipment performs MSC/VLR registration or whether the network side provides, in the PS domain, the short message service for the user equipment, whether to activate ISR, and specifically, if the user equipment performs MSC/VLR registration or the network side does not provide, in the PS domain, the short message service for the user equipment, the second mobility management network element does not activate the ISR, an SGW performs signaling interaction with the second mobility management network element and does not perform signaling interaction with the first mobility management network element, thereby saving a resource at the first mobility management network element side. Otherwise, that is, when the user equipment does not perform MSC/VLR registration or the network side provides, in the PS domain, the short message service for the user equipment, correspondingly, the second mobility management network element needs to activate the ISR.

By executing the step 410, when the user equipment does not perform MSC/VLR registration or the network side provides, in the PS domain, the short message service for the user equipment, the MME may be enabled to activate the ISR, thereby reducing signaling of the user equipment. When the user equipment performs MSC/VLR registration or the network side does not provide, in the PS domain, the short message service for the user equipment, the MME does not activate the ISR, the SGW performs signaling interaction with the second mobility management network element and does not perform signaling interaction with the first mobility management network element, so that signaling interaction between the SGW and the SGSN is reduced, and at the same time, it is avoided that the SGSN pages the user, thereby saving a paging resource of a GERAN/UTRAN.

In Embodiment 1, it is implemented that the corresponding location update procedure is executed only when the user equipment performs MSC/VLR registration at the first mobility management network element side or the network side does not provide, in the PS domain, the short message service for the user equipment, so as to cancel the corresponding MSC/VLR registration. In a case that the user equipment does not perform MSC/VLR registration at the first mobility management network element side, the location update operation is not initiated, thereby reducing signaling transmission and saving a network resource.

Embodiment 2

Figure 5A:
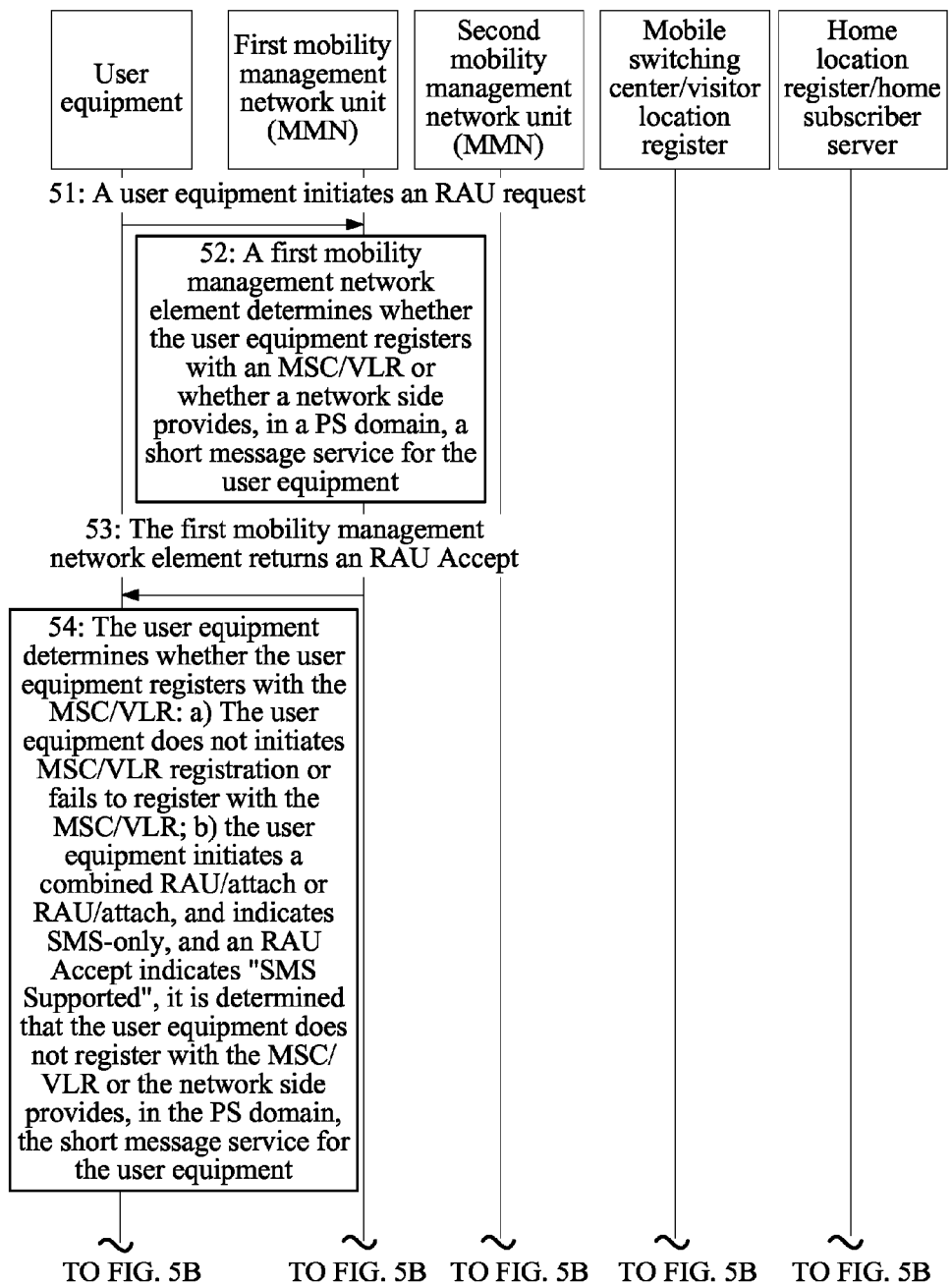

In this embodiment, that a second mobility management network element (such as an MME) acquires, through a user equipment, whether to perform MSC/VLR registration at a first mobility management network element (such as an SGSN) side or whether a network side provides, in a PS domain, a short message service for the user equipment and determines, according to whether the user equipment performs MSC/VLR registration or whether the network side provides, in the PS domain, the short message service for the user equipment, whether to send a message to an HSS/HLR to initiate a location update operation is taken as an example, and as shown in FIG. 5A and FIG. 5B, a corresponding specific implementation process may include:

Step 51: A user equipment initiates an RAU/attach request or a combined RAU/attach request at a first mobility management network element side.

Step 52: The first mobility management network element determines, according to the request message, whether to perform MSC/VLR registration or whether the network side provides, in the PS domain, the short message service for the user equipment.

Step 53: The first mobility management network element returns an RAU accept message to the user equipment.

Step 54: The user equipment determines whether to register with an MSC/VLR or whether the network side provides, in the PS domain, the short message service for the user equipment.

In this step, a corresponding manner for determining whether to register with the MSC/VLR or whether the network side provides, in the PS domain, the short message service for the user equipment may include, but not limited to, any one of the following manners:

Manner 1: If the user equipment does not initiate MSC/VLR registration or does not register with the MSC/VLR successfully, it is determined that the user equipment does not register with the MSC/VLR or the network side provides, in the PS domain, the short message service for the user equipment.

Manner 2: The user equipment initiates a combined RAU/attach request and indicates SMS-only, and then, if an RAU Accept message received by the user equipment indicates "SMS Supported", it is determined that the user equipment does not register with the MSC/VLR or the network side provides, in the PS domain, the short message service for the user equipment.

Step 55: The user equipment moves to an LTE side, initiates a TAU request or a combined TAU/LAU request to a second mobility management network element, and carries, in the request message, an identifier that is determined according to step 54 and indicates whether the user equipment registers with the MSC/VLR or whether the network side provides, in the PS domain, the short message service for the user equipment.

Through step 55, the user equipment may send corresponding indication information to the second mobility management network element, and specifically, the user equipment uses whether the user equipment registers with the MSC/VLR or whether the network side provides, in the PS domain, the short message service for the user equipment as indication information and transmits the indication information to the second mobility management network element.

Step 56: The second mobility management network element receives the TAU request or combined TAU/LAU request message, and decides, according to the identifier that is carried in the request message and indicates whether the user equipment registers with the MSC/VLR or whether the network side provides, in the PS domain, the short message service for the user equipment, whether to initiate a location update request.

Specifically, if the second mobility management network element determines, according to the identifier that is carried in the request message and indicates whether the user equipment registers with the MSC/VLR, that the user equipment does not perform MSC/VLR registration at the first mobility management network element side or the network side provides, in the PS domain, the short message service for the user equipment, the second mobility management network element does not send a message to an HSS/HLR, that is, does not initiate a location update request; otherwise, execute step 57, to initiate a corresponding location update processing procedure.

Step 57: If the second mobility management network element determines that the TAU request or combined TAU/LAU request message does not carry the identifier indicating whether the user equipment registers with the MSC/VLR or whether the network side provides, in the PS domain, the short message service for the user equipment, or that the TAU request or combined TAU/LAU request message carries the identifier indicating that the user equipment registers with the MSC/VLR, that is, the second mobility management network element determines that the user equipment performs MSC/VLR registration or the network side does not provide, in the PS domain, the short message service for the user equipment, the second mobility management network element sends a location update request message to the HSS/HLR, to initiate the location update operation.

Step 58: After the HSS/HLR receives the location update request of the second mobility management network element, the HSS/HLR cancels the registration of the user equipment with the MSC/VLR, and uses the second mobility management network element (such as an MME) as a destination point of an SMS service, so that the SMS service is sent to the user equipment through the second mobility management network element, instead of transmitting, to the MSC/VLR, the SMS service sent to the user equipment, thereby ensuring that the user equipment moving to the second mobility management network element may carry out the SMS service normally based on the second mobility management network element.

In Embodiment 2, similarly, it may be implemented that the corresponding location update procedure is executed only when the user equipment performs MSC/VLR registration or the network side does not provide, in the PS domain, the short message service for the user equipment, so as to ensure that the SMS service can be transmitted to the user equipment reliably. In a case that the user equipment does not perform MSC/VLR registration or the network side provides, in the PS domain, the short message service for the user equipment, the location update operation is not initiated, thereby reducing signaling transmission, saving a resource in a communication network, and improving performance of the communication network.

Embodiment 3

Figure 6:
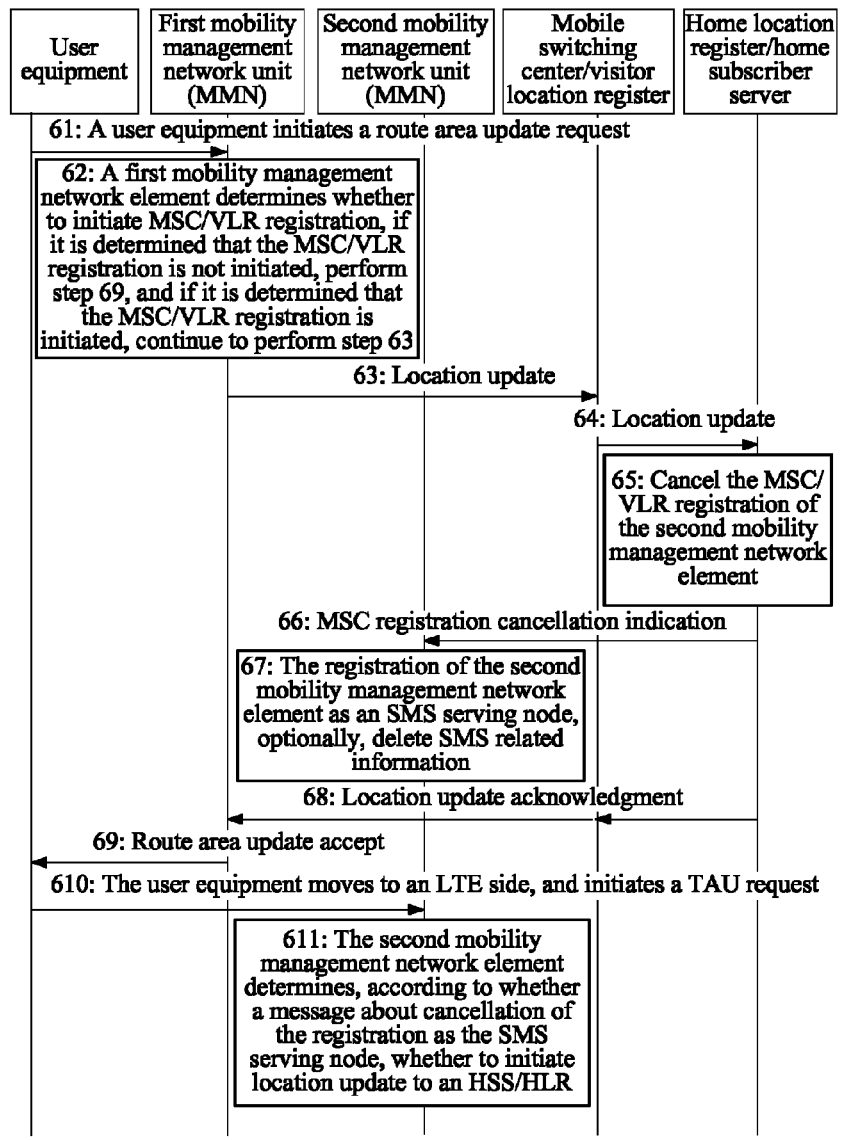
FIG. 6 is a flow chart of an application embodiment 3 of a method according to an embodiment of the present invention.

In this embodiment, specifically, an implementation manner in which an HSS/HLR cancels a registration of a second mobility management network element (such as an MME) as a short message serving node and notifies the second mobility management network element, so that the second mobility management determines whether to send a message to the HSS/HLR to initiate a location update operation is taken as an example, and as shown in FIG. 6, a specific implementation process may include:

Step 61: A user equipment initiates a combined RAU/LAU request at a first mobility management network element (such as an SGSN) side.

Step 62: The first mobility management network element determines, according to the request message, whether to perform MSC/VLR registration, if the MSC/VLR registration is not initiated, execute step 68, and if the MSC/VLR registration is initiated, execute step 63.

Step 63: The first mobility management network element sends a location update message to an MSC/VLR.

It should be noted that, steps 61 to 63 only provide a manner for the user equipment to register with the MSC, and the present invention is not limited to the manner, for example, the user equipment may also directly send a location update request to the MSC/VLR without through the first mobility management network element.

Step 64: After receiving the location update message, the MSC/VLR sends the location update request to an HSS/HLR.

Step 65: After receiving the location update request, the HSS/HLR determines that the user equipment performs MSC/VLR registration, and cancels registration of a second mobility management network element as a short message serving node.

Step 66: The HSS/HLR cancels the registration of the second mobility management network element as the short message serving node, and sends a message to the second mobility management network element, to notify cancelation of the registration of the second mobility management network element as the short message serving node.

Step 67: After receiving the message of canceling the registration as the serving node, the second mobility management network element cancels SMS registration of the user equipment locally and reserves PS domain registration, to ensure that a PS service of the user equipment, except for an SMS service, may still be carried out normally through the second mobility management network element.

Step 68: The HSS/HLR returns a location update acknowledgment message to the MSC/VLR and the first mobility management network element, to notify the MSC/VLR and the first mobility management network element that the corresponding user equipment has performed MSC/VLR registration, that is, the HSS/HLR records the MSC/VLR as a destination point of the SMS service, and the user equipment carries out the SMS service through the MSC/VLR.

Step 69: The first mobility management network element sends a route area update accept message to the user equipment, and so far, a route area update processing procedure initiated by the user equipment is completed.

Step 610: The user equipment moves to an LTE side, initiates a (combined) tracking area update request to the second mobility management network element, and indicates that only a short message is required.

Step 611: After receiving the request initiated by the user equipment, the second mobility management network element determines that the user equipment indicates "SMS only" (only a short message is required), and PS (packet switch, packet switch) subscription data allows a short message service, and then decides, according to whether the second mobility management network element receives the message sent in the step 66, and optionally, in combination with whether the PS subscription data allows the short message, whether to send a message to the HSS/HLR.

Specifically, if the HSS/HLR cancels the registration of the second mobility management network element as the short message serving node with the HSS/HLR, the HSS/HLR may further determine whether the PS subscription data allows carrying out the short message, if the PS subscription data allows carrying out the short message, it indicates that the user equipment performs MSC/VLR registration, and in this case, it is required to send a message to the HSS/HLR, to register the second mobility management network element as the short message serving node, and cancel the MSC/VLR registration of the user equipment, thereby ensuring that the user equipment moving to the LTE side may perform the SMS service through the MME serving as the second mobility management network element; otherwise, it indicates that the user equipment does not perform MSC/VLR registration, and in this case, it is not required to send a message to the HSS/HLR, that is, it is not required to initiate the location update request, and the user equipment may directly carry out the SMS service through the MME.

It can be seen from the processing procedure executed in step 611 that, if the HSS/HLR does not cancel the registration of the second mobility management network element as the short message serving node, that is, the user equipment does not perform MSC/VLR registration, the location update procedure is not initiated, thereby reducing signaling transmitted in a network and saving a network communication resource. When the second mobility management network element cancels the registration of the second mobility management network element as the short message serving node, that is, it is determined that the user equipment performs MSC/VLR registration, it is required to initiate the location update procedure, cancel the MSC/VLR registration performed by the user equipment, and use the MME as the destination point of the SMS service, so as to ensure that the SMS service of the user equipment moving to the MME may be transmitted through the MME.

Through the technical solutions provided in the foregoing embodiments, the second mobility management network element may determine, according to the indication information sent by the first mobility management network element or the user equipment, whether to initiate the location update to the HSS/HLR, for example, if the user equipment does not perform MSC registration, the location update is not initiated to the HSS/HLR, and therefore, dual registration of the second mobility management network element and the first mobility management network element in the HSS/HLR may be maintained, thereby reducing interaction between the first mobility management network element, the second mobility management network element, and the HSS/HLR, so as to achieve effects of reducing signaling and lowering an HSS/HLR load. Correspondingly, a process of whether to activate the ISR may also be controlled flexibly according to the corresponding indication information, so that the ISR may be activated only when necessary, thereby reducing signaling interacted in the communication system as much as possible, and saving a resource of the communication system.

Persons of ordinary skill in the art should understand that, all or a part of procedure in the method according to the foregoing embodiments may be accomplished by a computer program instructing relevant hardware. The program may be stored in a computer-readable storage medium. When the program is executed, the procedure of the method according to the foregoing embodiments may be performed. The storage medium may be a magnetic disk, an optical disk, a read-only memory (Read-Only Memory, ROM), or a random access memory (Random Access Memory, RAM), or the like.

An embodiment of the present invention further provides a signaling reduction apparatus in a communication network, and as shown in FIG. 7A to FIG. 7D, the apparatus may specifically include the following processing units:

an indication information receiving unit 71, configured to receive indication information, where the indication information may include, but not limited to: indication information used to indicate whether to send a message to a home subscriber server HSS/HLR, or indication information used to indicate whether to activate ISR, or indication information used to indicate whether to send a message to an HSS/HLR and whether to activate ISR, or indication information used to indicate whether a user equipment registers with a third mobility management network element, or indication information used to indicate that a user equipment or a first mobility management network element network side provides, in a PS domain, a short message service for the user equipment or that a network side does not provide, in a PS domain, a short message service for a user equipment, where the sending a message to the HSS or HLR may be used to register an SMS node of the user equipment as a second mobility management network element, so that the user equipment may carry out an SMS service through the second mobility management network element; and an operation execution processing unit 72, configured to determine, according to the indication information received by the indication information receiving unit 71, whether to execute at least one of sending a message to the HSS or HLR and not activating the ISR, or, to execute at least one of not sending a message to the HSS or HLR and determining that the ISR may be activated.

Specifically, the operation executed by the operation execution processing unit 72 may specifically include:

when the indication information is the indication information used to indicate that the user equipment registers with the third mobility management network element, determining, by the second mobility management network element, to execute at least one of not activating the ISR or sending a message to the HSS or HLR; or when the indication information is the indication information used to indicate that the user equipment does not register with the third mobility management network element, determining, by the second mobility management network element, that at least one of activating the ISR or not sending a message to the HSS or HLR may be executed; or when the indication information is the indication information used to indicate that the network side provides, in the PS domain, the short message service for the user equipment, determining, by the second mobility management network element, that at least one of activating the ISR or not sending a message to the HSS or MR may be executed; or when the indication information is used to indicate that the network side does not provide, in the PS domain, the short message service for the user equipment, determining, by the second mobility management network element, to execute at least one of not activating the ISR or sending a message to the HSS or HLR.

Figure 7A:
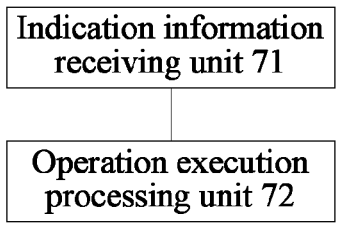
FIG. 7A is a first schematic structural diagram of an apparatus according to an embodiment of the present invention.
Figure 7B:
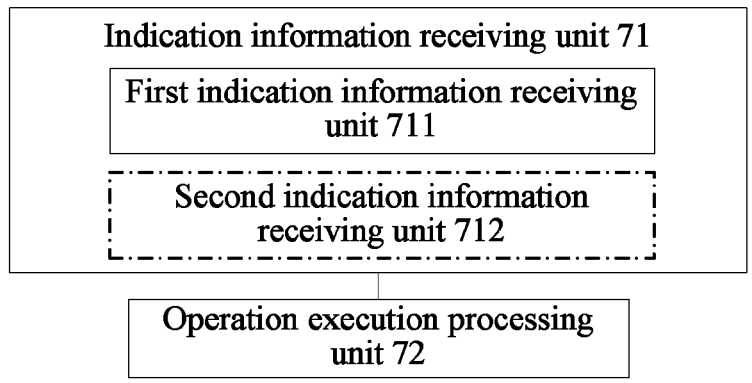
FIG. 7B is a second schematic structural diagram of an apparatus according to an embodiment of the present invention.

Optionally, as shown in FIG. 7B, the indication information receiving unit 71 may specifically include: a first indication information receiving unit 711, or a second indication information receiving unit 712.

The first indication information receiving unit 711 is configured to receive indication information sent by the first mobility management network element, where the indication information is determined by the first mobility management network element according to a determination result after it is determined, according to a message communicated with the user equipment, whether the user equipment registers with the third mobility management network element or whether the network side provides, in the PS domain, the short message service for the user equipment; and the first indication information receiving unit 711 may specifically be configured to receive a context response message sent by the first mobility management network element, and acquire indication information carried in the context response message from the context response message. A corresponding manner for the first mobility management network element to determine whether the user equipment registers with the third mobility management network element or whether the network side provides, in the PS domain, the short message service for the user equipment may include:

when the user equipment initiates a combined route update RAU and location update LAU or RAU, if subscription data is PS-only enforced or PS-only enabled, or the user equipment indicates SMS-only and the first mobility management network element supports the short message service, the first mobility management network element determines that the user equipment does not register with the third mobility management network element or the network side provides, in the PS domain, the short message service for the user equipment; or the user equipment indicates, in the RAU, to the first mobility management network element whether the user equipment executes an LAU process, if the user equipment executes the LAU process, it is determined that the user equipment registers with the third mobility management network element or the network side does not provide, in the PS domain, the short message service for the user equipment, otherwise, it is determined that the user equipment does not register with the third mobility management network element or the network side provides, in the PS domain, the short message service for the user equipment; or the first mobility management network element indicates, in a message sent to the user equipment, that the user equipment supports a short message or PS only, the first mobility management network element determines that the user equipment does not register with the third mobility management network element or the network side provides, in the PS domain, the short message service for the user equipment.

The second indication information receiving unit 712 is configured to receive indication information sent by the user equipment, where the indication information is determined by the user equipment according to a determination result after it is determined whether the user equipment registers with the third mobility management network element or whether the network side provides, in the PS domain, the short message service for the user equipment; and the second indication information receiving unit 712 receives a TAU request message that is initiated to the second mobility management network element and is sent by the user equipment, and acquires indication information carried in the TAU request message from the TAU request message. A manner for the user equipment to determine whether the user equipment registers with the third mobility management network element or whether the network side provides, in the PS domain, the short message service for the user equipment may include:

if the user equipment does not initiates registration with the third mobility management network element or does not register with the third mobility management network element successfully, it is determined that the user equipment does not register with the third mobility management network element; or the user equipment initiates a combined RAU or LAU and indicates SMS-only, and if a received RAU accept RAU Accept message indicates SMS Supported, it is determined that the user equipment does not register with the third mobility management network element or the network side provides, in the PS domain, the short message service for the user equipment.

In the first indication information receiving unit 711 and the second indication information receiving unit 712, if the user equipment registers with the third mobility management network element or the network side does not provide, in the PS domain, the short message service for the user equipment, the corresponding indication information is used to instruct the second mobility management network element to execute at least one of not activating the ISR and sending a message to the HSS or HLR, or used to indicate that the user equipment registers with the third mobility management network element or the network side does not provide, in the PS domain, the short message service for the user equipment; if the user equipment does not register with the third mobility management network element or the network side provides, in the PS domain, the short message service for the user equipment, the corresponding indication information is used to instruct the second mobility management network element to execute at least one of determining that the ISR may be activated and not sending a message to the HSS or MR, or used to indicate that the user equipment does not register with the third mobility management network element or the network side provides, in the PS domain, the short message service for the user equipment.

Figure 7C:
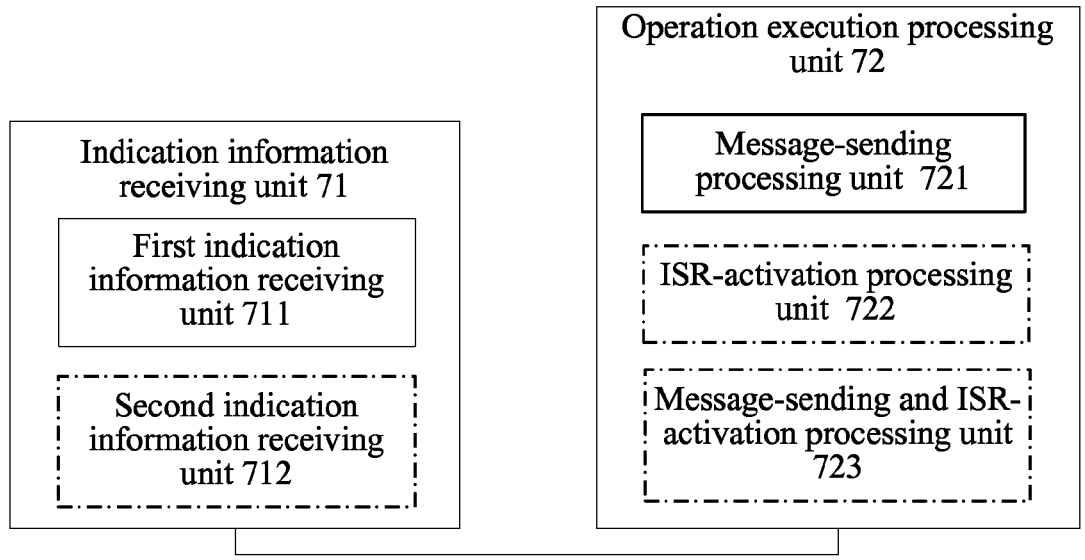
FIG. 7C is a third schematic structural diagram of an apparatus according to an embodiment of the present invention.

Optionally, as shown in FIG. 7C, the operation execution processing unit 72 includes a message-sending processing unit 721, or an ISR-activation processing unit 722, or a message-sending and ISR-activation processing unit 723.

The message-sending processing unit 721 is configured to send a message to the HSS if the indication information received by the indication information receiving unit 71 is used to indicate sending a message to the HSS or MR, and not send a message to the HSS or HLR if the corresponding indication information is used to indicate not sending a message to the HSS or HLR; send a message to the HSS or HLR if the corresponding indication information is used to indicate that the user equipment registers with the third mobility management network element or the network side does not provide, in the PS domain, the short message service for the user equipment, and not send a message to the HSS or HLR if the corresponding indication information is used to indicate that the user equipment does not register with the third mobility management network element or the network side provides, in the PS domain, the short message service for the user equipment.

The ISR-activation processing unit 722 is configured to activate the ISR if the indication information received by the indication information receiving unit 71 is used to indicate determining that the ISR may be activated, and not activate the ISR if the corresponding indication information is used to indicate not activating the ISR, where an SGW performs signaling interaction with the second mobility management network element, but does not perform signaling interaction with the first mobility management network element, thereby saving a resource at the first mobility management network element side; activate the ISR if the corresponding indication information is used to indicate that the user equipment does not register with the third mobility management network element or the network side provides, in the PS domain, the short message service for the user equipment, and not activate the ISR if the corresponding indication information is used to indicate that the user equipment registers with the third mobility management network element or the network side does not provide, in the PS domain, the short message service for the user equipment.

The message-sending and ISR-activation processing unit 723 is configured to send a message to the HSS or HLR and not activate the ISR if the indication information received by the indication information receiving unit 71 is used to indicate sending a message to the HSS and not activating the ISR, and not send a message to the HSS or HLR but activate the ISR if the corresponding indication information is used to indicate not sending a message to the HSS or HLR and determining that the ISR may be activated; not send a message to the HSS or HLR but activate the ISR if the corresponding indication information is used to indicate that the user equipment does not register with the third mobility management network element or the network side provides, in the PS domain, the short message service for the user equipment, and send a message to the HSS or HLR and not activate the ISR if the corresponding indication information is used to indicate that the user equipment registers with the third mobility management network element or the network side does not provide, in the PS domain, the short message service for the user equipment.

In the apparatus, when executing the sending a message to the HSS/HLR, the apparatus may be disposed at an MME serving as the second mobility management network element, the corresponding first mobility management network element includes an SGSN, and the third mobility management network element includes an MSC/VLR; or, when executing the activating the ISR, the apparatus is disposed in an MME or SGSN of the second mobility management network element, the corresponding first mobility management network element includes the SGSN or MME (specifically, if the second mobility management network element is the MME, the first mobility management network element is the SGSN, and if the second mobility management network element is the SGSN, the first mobility management network element is the MME), and the third mobility management network element includes an MSC/VLR.

Figure 7D:
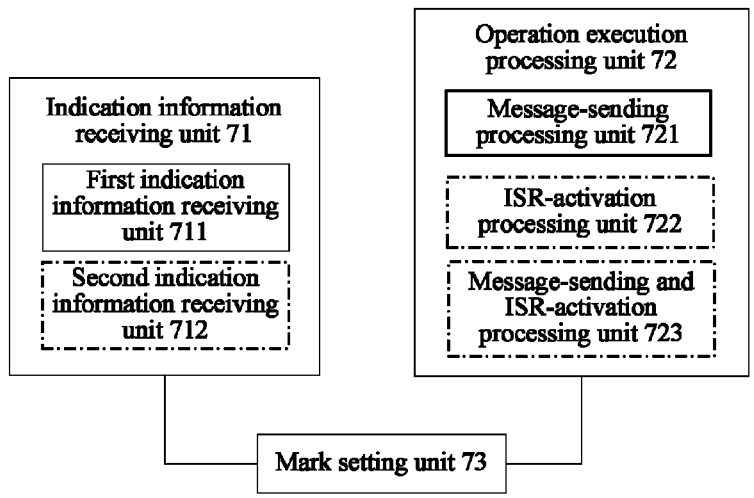
FIG. 7D is a fourth schematic structural diagram of an apparatus according to an embodiment of the present invention.

Optionally, because the processing procedure executed by the indication information receiving unit 71 and the processing procedure executed by the operation execution processing unit 72 may not necessarily be successive processing procedures, as shown in FIG. 7D, the apparatus may further include a mark setting unit 73, which is configured to set a corresponding mark according to the indication information after the indication information is received, where the mark is used to instruct the operation execution processing unit 72 whether to execute at least one of sending a message to the HSS or HLR and not activating the ISR, or execute at least one of not sending a message to the HSS or HLR and determining that the ISR may be activated, and therefore, as long as the corresponding mark is set according to the indication information, the operation execution processing unit 72 may perform the corresponding determination operation according to the mark when it is required to determine whether to execute the corresponding operation.

Figure 7E:
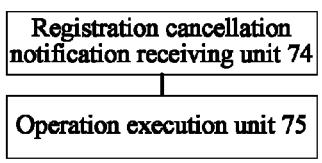
FIG. 7E is a schematic structural diagram of another apparatus according to an embodiment of the present invention.

An embodiment of the present invention further provides another signaling reduction apparatus in a communication network, and as shown in FIG. 7E, the apparatus includes:

a registration cancellation notification receiving unit 74, configured to receive a notification sent by an HSS or HLR about canceling SMS registration; and an operation execution unit 75, configured to determine, according to the notification received by the registration cancellation notification receiving unit 74, sending a message to the HSS or HLR and/or not activating ISR; optionally, if the registration cancellation notification receiving unit 74 does not receive the notification, the operation execution unit 75 determines not sending a message to the HSS or HLR and/or determining that the ISR may be activated.

Correspondingly, a manner for determining, on the HSS/HLR, that the registration cancellation notification receiving unit 74 receives the notification about canceling SMS registration may include: After acquiring that the user equipment registers with a third mobility management network element, the HSS or HLR cancels the SMS registration at a second mobility management network element side, and sends the notification about canceling SMS registration to the second mobility management network element, and therefore, the registration cancellation notification receiving unit 74 in the second mobility management network element may receive the notification. The second mobility management network element may correctly select, according to whether the notification is received, whether to execute sending a message to the HSS or HLR and/or whether to activate the ISR, so that it is ensured that, only in a case that the user equipment registers with the third mobility management network element (only in this case, the registration cancellation notification receiving unit 74 on the second mobility management network element can receive the notification about canceling SMS registration), the operation of sending a message to the HSS or HLR and/or not activating the ISR is executed, thereby reducing signaling interacted in a communication system, and saving a communication resource in the communication system.

Figure 8:
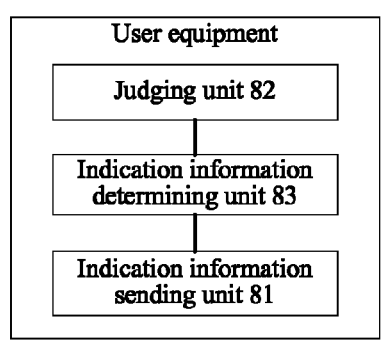
FIG. 8 is a schematic structural diagram of a user equipment according to an embodiment of the present invention.

An embodiment of the present invention further provides a user equipment, and a specific implementation structure of the user equipment is shown in FIG. 8, where the user equipment includes:

an indication information sending unit 81, configured to send indication information to a second mobility management network element, where the corresponding indication information is used to indicate at least one of sending a message to an HSS or HLR and not activating ISR, or indicate executing at least one of not sending a message to an HSS or HLR and determining that ISR may be activated, and the corresponding indication information sending unit 81 may specifically be configured to, but not limited to, carry the indication information in an access request message initiated to the second mobility management network element and send the access request message to the second mobility management network element.

In the user equipment, the corresponding indication information may include, but not limited to: indication information used to indicate sending a message to the HSS or HLR or not sending a message to the HSS or HLR, or indication information used to indicate that the ISR may be activated and indicate not activating the ISR, or indication information used to indicate sending a message to the HSS or HLR and not activating the ISR, or not sending a message to the HSS or HLR and activating the ISR, or indication information used to indicate that the user equipment registers with a third mobility management network element or the user equipment does not register with a third mobility management network element.

Optionally, the user equipment may further include a judging unit 82 and an indication information determining unit 83.

The judging unit 82 is configured to determine whether the user equipment registers with the third mobility management network element, where a manner for the judging unit to determine whether the user equipment registers with the third mobility management network element may include, but not limited to:

if the user equipment does not initiate registration with the third mobility management network element or the user equipment fails to register with the third mobility management network element, determining, by the user equipment, that the user equipment does not register with the third mobility management network element or a network side provides, in a PS domain, a short message service for the user equipment;

or, initiating, by the user equipment, a combined RAU or LAU to indicate that a short message is supported or that a network side provides, in a PS domain, a short message service for the user equipment, and if a received RAU accept RAU Accept message indicates SMS Supported, determining, by the user equipment, that the user equipment does not register with the third mobility management network element or the network side provides, in the PS domain, the short message service for the user equipment.

The indication information determining unit 83 is configured to determine corresponding indication information according to a determination result of the judging unit 82 about whether the user equipment registers with the third mobility management network element, so as to provide the indication information to the indication information sending unit 81.

In this embodiment, the second mobility management network element communicating with the user equipment may be disposed with the signaling reduction apparatus in a communication network as shown in FIG. 7A to FIG. 7D.

The implementation of the foregoing embodiments of the present invention may enable the MME to correctly send a message to the HSS/HLR, so that the HSS/HLR sets the MME to a short message destination point, and therefore, it is ensured that a user can receive a short message normally after returning to LTE, and it is also ensured that the MME sends the message to the HSS/HLR only when necessary, thereby reducing signaling interaction between the MME and the HSS/HLR. In addition, entities such as the MME or SGSN may further activate the ISR correctly according to the indication information, thereby avoiding unnecessary signaling interaction between the SGW and the SGNS/MME, so as to save a communication resource in the communication system and improve communication performance of the communication system.

The foregoing descriptions are merely exemplary implementation manners of the present invention, but are not intended to limit the protection scope of the present invention. Any variation or replacement that may be easily made by persons skilled in the art within the technical scope disclosed in the present invention should fall within the protection scope of the present invention.

Therefore, the protection scope of the present invention shall be subject to the protection scope of the claims.

What is claimed is:

1. A signaling reduction method in a communication network, comprising:
    registering a second mobility management network element with a home subscriber server (HSS) or a home location register (HLR) as a short messaging service (SMS) serving node of a user equipment;
    receiving, by the second mobility management network element, a notification sent by the HSS or the HLR when the user equipment registers with a mobile switching center (MSC) or a visitor location register (VLR), wherein the notification notifies the second mobility management network element of canceling the second mobility management network element serving as an SMS serving node of the user equipment;
    canceling, by the second mobility management network element, the registration of the second mobility management network element serving as the SMS serving node of the user equipment with the HSS or the HLR; and not cancelling, by the second mobility management network element, evolved packet system (EPS) service of the user equipment.

2. The method according to claim 1, wherein canceling the registration of the second mobility management network element serving as the SMS serving node of the user equipment with the HSS or the HLR comprises:
    deleting, by the second mobility management network element, subscription information related to short message of the user equipment.

3. The method according to claim 1, further comprising:
    receiving, by the second mobility management network element, a tracking area update request or combined tracking area update request of the user equipment, wherein the request comprises an "SMS only" indication; and
    acquiring, by the second mobility management network element according to PS subscription data of a user, that the user is allowed to use a short message service;
    sending, a message to the HSS or the HLR to register the second mobility management network element as a short message service SMS serving node.

4. The method according to claim 1, wherein before the step of receiving, by a second mobility management network element, a notification sent by the HSS or the HLR, the method comprises:
    after acquiring that the user equipment registers with the MSC or the VLR, sending, by the HSS or the HLR to the second mobility management network element, the notification.

5. The method according to claim 4, wherein the step of acquiring, by the HSS or the HLR, that the user equipment registers with the MSC or the VLR comprises:

receiving, by the HSS or the HLR, a notification that is sent by the MSC or the VLR and indicates that the user equipment registers with the MSC or the VLR, and acquiring, by the HSS or the HLR, that the user equipment registers with the MSC or the VLR.

6. The method according to claim 1, wherein the step of receiving a notification sent by the HSS or the HLR comprises:

receiveing, by the second mobility management network element, a cancel location request message sent by the HSS or the HLR, wherein the message comprises a cancellation type information element instructing the second mobility management network element to cancel the registration of the second mobility management network element as the short message serving node.

7. A signaling reduction apparatus, which is a mobility management network element in a communication network, comprising a processor and a receiver, wherein:

the processor is configured to register with a home subscriber server (HSS) or a home location register (HLR) as a short messaging service (SMS) serving node of a user equipment;

the receiver is configured to receive a notification sent by the HSS or the HLR when the user equipment registers with a mobile switching center (MSC) or a visitor location register (VLR), wherein the notification notifies the apparatus of canceling the apparatus serving as the SMS serving node of the user equipment; and the processor is further configured to, if the receiver receives the notification, cancel the registration of the apparatus serving as the SMS serving node of the user equipment with the HSS or the HLR, and not cancel evolved packet system (EPS) service of the user equipment.

8. The apparatus according to claim 7, wherein in canceling the registration of the apparatus serving as the SMS serving node of the user equipment with the HSS or the HLR:

the processor is further configured to delete subscription information related to short message of the user equipment.

9. The apparatus according to claim 7, wherein the apparatus further comprises a transmitter, the receiver is further configured to receive, a tracking area update request or combined tracking area update request of the user equipment, wherein the request comprises an "SMS only" indication; and the processor is further configured to acquire according to PS subscription data of a user, that the user is allowed to use a short message service; and the transmitter is configured to send a message to the HSS or the HLR to register the apparatus as a short message service SMS serving node.

10. The apparatus according to claim 7, wherein in receiving a notification sent by an HSS or the HLR, the receiver receiving unit is specifically configured to:

receive a cancel location request message sent by the HSS or the HLR, and the message comprises a cancellation type information element to indicate cancellation of the registration of the apparatus as the SMS serving node.

11. A system comprising a mobility management network element, and a home subscriber server (HSS) or a home location register (HLR), wherein, the mobility management network element is configured to register with the HSS or the HLR as a short messaging service (SMS) serving node of a user equipment; to receive, a notification sent by the HSS or the HLR when the user equipment registers with a mobile switching center (MSC) or a visitor location register (VLR), wherein the notification notifies the mobility management network element of canceling the mobility management network element serving as the SMS serving node of the user equipment; to cancel the registration of the mobility management network element serving as the SMS serving node of the user equipment with the HSS or the HLR; and not to cancel, evolved packet system (EPS) service of the user equipment; and the HSS is configured to send the notification to the mobility management network element.

* * * * *